United States Patent
Seo et al.

(10) Patent No.: US 11,889,478 B2
(45) Date of Patent: *Jan. 30, 2024

(54) METHOD BY WHICH TERMINAL PERFORMS SIDELINK OPERATION IN WIRELESS COMMUNICATION SYSTEM, AND TERMINAL USING METHOD

(71) Applicant: LG ELECTRONICS INC., Seoul (KR)

(72) Inventors: Hanbyul Seo, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/368,346

(22) Filed: Sep. 14, 2023

(65) Prior Publication Data

US 2024/0007999 A1  Jan. 4, 2024

Related U.S. Application Data

(63) Continuation of application No. 17/287,400, filed as application No. PCT/KR2019/014288 on Oct. 28, 2019, now Pat. No. 11,765,689.

(60) Provisional application No. 62/751,694, filed on Oct. 28, 2018.

(51) Int. Cl.
*H04W 4/00* (2018.01)
*H04W 72/02* (2009.01)
*H04L 1/1812* (2023.01)
*H04L 1/1867* (2023.01)
*H04W 92/18* (2009.01)

(52) U.S. Cl.
CPC .......... *H04W 72/02* (2013.01); *H04L 1/1819* (2013.01); *H04L 1/1896* (2013.01); *H04W 92/18* (2013.01)

(58) Field of Classification Search
CPC .... H04W 72/02; H04W 92/18; H04L 1/1819; H04L 1/1896
USPC .......................................... 370/329, 330, 328
See application file for complete search history.

(56) References Cited

U.S. PATENT DOCUMENTS

| | | | | |
|---|---|---|---|---|
| 10,492,179 B2* | 11/2019 | Baldemair | ............ | H04L 5/0055 |
| 2020/0029318 A1* | 1/2020 | Guo | ........................ | H04L 1/1822 |
| 2020/0037343 A1* | 1/2020 | He | .................... | H04W 28/0268 |
| 2021/0306824 A1* | 9/2021 | Li | ............................ | H04W 4/40 |
| 2021/0400636 A1* | 12/2021 | Seo | ........................ | H04L 1/1861 |

* cited by examiner

*Primary Examiner* — Chuong T Ho
(74) *Attorney, Agent, or Firm* — LEE, HONG, DEGERMAN, KANG & WAIMEY

(57) ABSTRACT

Proposed is a method for performing a sidelink operation in a wireless communication system, the method being performed by a terminal. The method comprises: selecting a preferred resource pool from among a plurality of resource pools, wherein the preferred resource pool is one of a first resource pool including a physical sidelink feedback channel (PSFCH) resource and a second resource pool without the PSFCH resource; and, on the basis of a re-selection condition, performing the sidelink operation on the first resource pool or the second resource pool.

12 Claims, 31 Drawing Sheets

(a)

(b)

(a)

(b)

METHOD BY WHICH TERMINAL PERFORMS SIDELINK OPERATION IN WIRELESS COMMUNICATION SYSTEM, AND TERMINAL USING METHOD

CROSS-REFERENCE TO RELATED APPLICATIONS

This application is a continuation of U.S. patent application Ser. No. 17/287,400, filed on Apr. 21, 2021, which is the National Stage filing under 35 U.S.C. 371 of International Application No. PCT/KR2019/014288, filed on Oct. 28, 2019, which claims the benefit of U.S. Provisional Application No. 62/751,694 filed on Oct. 28, 2018, the contents of which are all hereby incorporated by reference herein their entirety.

BACKGROUND OF THE DISCLOSURE

Field of the Disclosure

The present disclosure relates to wireless communication.

Related Art

A wireless communication system is a multiple access system that supports communication of multiple users by sharing available system resources (e.g., a bandwidth, transmission power, and so on) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, a Multi-Carrier Frequency Division Multiple Access (MC-FDMA) system, and so on.

Sidelink (SL) communication is a communication scheme, wherein direct link is established between User Equipments (UEs), and wherein the UEs directly exchange voice and data without intervention of an evolved Node B (eNB). SL communication is being considered as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 different types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive MTC, Ultra-Reliable and Low Latency Communication (URLLC), and so on, may be referred to as a new radio access technology (RAT) or new radio (NR). Herein, the vehicle-to-everything (V2X) communication may also be supported in NR.

SUMMARY OF THE DISCLOSURE

Technical Objects

A technical object, which is devised to be resolved by the present disclosure, is to provide a method for performing sidelink operations by a user equipment (UE) in a wireless communication system, and a user equipment (UE) using the same.

Technical Solutions

In one aspect, provided is a method for performing a sidelink operation in a wireless communication system. The method performed by a user equipment (UE) comprises selecting a preferred resource pool among multiple resource pools, wherein the preferred resource pool is one of a first resource pool including a physical sidelink feedback channel (PSFCH) resource and a second resource pool not including the PSFCH resource; and based on a reselection condition, performing the sidelink operation on the first resource pool or the second resource pool.

Based on the reselection condition being satisfied, the UE may perform the sidelink operation on a resource pool not being the preferred resource pool, among the first resource pool and the second resource pool.

Based on the reselection condition not being satisfied, the UE may perform the sidelink operation on a resource pool being the preferred resource pool, among the first resource pool and the second resource pool.

Based on a channel busy ratio (CBR) of the preferred resource pool being greater than a CBR-threshold value, the reselection condition may be satisfied.

Based on the preferred resource pool being the first resource pool, the CBR-threshold value may be equal to 100%.

Based on the preferred resource pool being the second resource pool, the CBR-threshold value may be equal to k %, and k may be an integer greater than or equal to 0 and less than 100.

Based on the preferred resource pool not satisfying latency requirement, the reselection condition may be satisfied.

The preferred resource pool may be selected based on a packet received by the UE.

Based on the packet being a packet requesting feedback, the first resource pool may be selected as the preferred resource pool.

Based on the packet being transmitted on the first resource pool, feedback information being related to the packet may be transmitted through the PSFCH resource, and the feedback information may be a hybrid automatic repeat request-acknowledgement/negative acknowledgement (HARQ-ACK/NACK).

Based on a priority of a packet received by the UE being higher than a priority-threshold value, the UE may perform the sidelink operation on the first resource pool or the second resource pool based on the reselection condition.

The priority may be a ProSe Per-Packet Priority (PPPP).

The sidelink operation may be a transmission of a physical sidelink shared channel (PSSCH).

In another aspect, provided is a user equipment (UE) comprising: a transceiver transmitting and receiving radio signals; and a processor being operatively connected to the transceiver, wherein the processor is configured to: select a preferred resource pool among multiple resource pools, wherein the preferred resource pool is one of a first resource pool including a physical sidelink feedback channel (PSFCH) resource and a second resource pool not including the PSFCH resource, and based on a reselection condition, perform the sidelink operation on the first resource pool or the second resource pool.

The UE may communicate with at least one of a mobile terminal, a network, and a self-driving vehicle other than the UE.

Effects of the Disclosure

According to the present disclosure, since PSSCHs having different lengths or different end symbol positions are separated from a resource pool region, a system may avoid inefficiency that may occur due to multiplexing of different PSSCH lengths. Additionally, by allowing an exception of using non-preferred PSSCH lengths, resource fragmentation may be prevented.

DESCRIPTION OF EXEMPLARY EMBODIMENTS

In various embodiments of the present disclosure, it shall be interpreted that "I" and "," indicate "and/or". For example, "A/B" may mean "A and/or B". Additionally, "A, B" may also mean "A and/or B". Moreover, "A/B/C" may mean "at least one of A, B and/or C". Furthermore, "A, B, C" may also mean "at least one of A, B and/or C".

Furthermore, in various embodiments of the present disclosure, it shall be interpreted that "or" indicates "and/or". For example, "A or B" may include "only A", "only B", and/or "both A and B". In other words, in various embodiments of the present disclosure, it shall be interpreted that "or" indicates "additionally or alternatively".

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A, which is a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features of the present disclosure will not be limited only to this.

Figure 1:
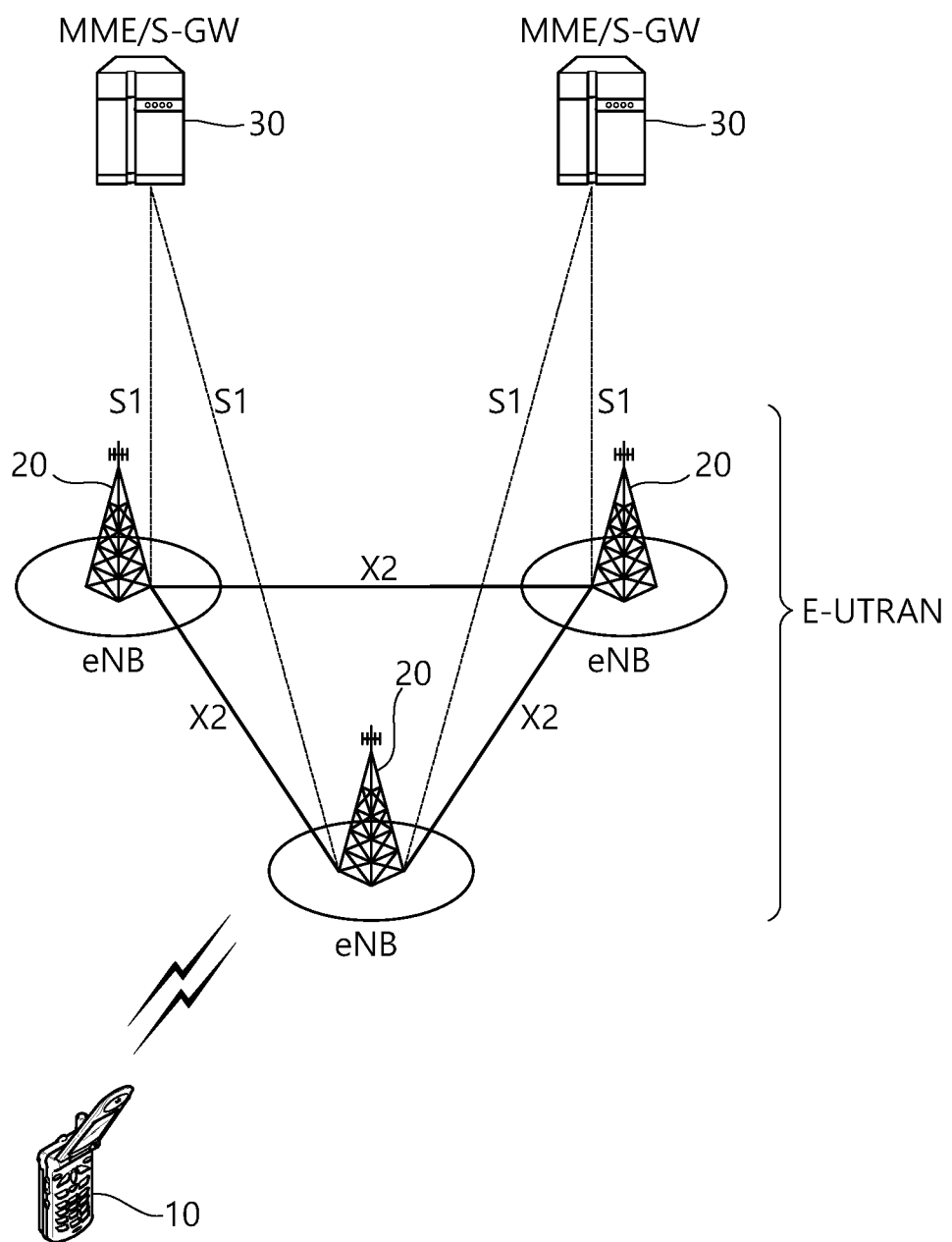
FIG. 1 shows a structure of an LTE system in accordance with an embodiment of the present disclosure.

FIG. 1 shows a structure of an LTE system in accordance with an embodiment of the present disclosure. This may also be referred to as an Evolved-UMTS Terrestrial Radio Access Network (E-UTRAN), or a Long Term Evolution (LTE)/LTE-A system.

Referring to FIG. 1, the E-UTRAN includes a base station (BS) (20), which provides a control plane and a user plane to a user equipment (UE) (10). The UE (10) may be fixed or mobile and may also be referred to by using different terms, such as Mobile Station (MS), User Terminal (UT), Subscriber Station (SS), Mobile Terminal (MT), wireless device, and so on. The base station (20) refers to a fixed station that communicates with the UE (10) and may also be referred to by using different terms, such as evolved-NodeB (eNB), Base Transceiver System (BTS), Access Point (AP), and so on.

The base stations (20) are interconnected to one another through an X2 interface. The base stations (20) are connected to an Evolved Packet Core (EPC) (30) through an S1 interface. More specifically, the base station (20) are connected to a Mobility Management Entity (MME) through an S1-MME interface and connected to Serving Gateway (S-GW) through an S1-U interface.

The EPC (30) is configured of an MME, an S-GW, and a Packet Data Network-Gateway (P-GW). The MME has UE access information or UE capability information, and such information may be primarily used in UE mobility management. The S-GW is a gateway having an E-UTRAN as its endpoint. And, the P-GW is a gateway having a Packet Data Network (PDN) as its endpoint.

Layers of a radio interface protocol between the UE and the network may be classified into a first layer (L1), a second layer (L2), and a third layer (L3) based on the lower three layers of an open system interconnection (OSI) model, which is well-known in the communication system. Herein, a physical layer belonging to the first layer provides a physical channel using an Information Transfer Service, and a Radio Resource Control (RRC) layer, which is located in the third layer, executes a function of controlling radio resources between the UE and the network. For this, the RRC layer exchanges RRC messages between the UE and the base station.

Figure 2:
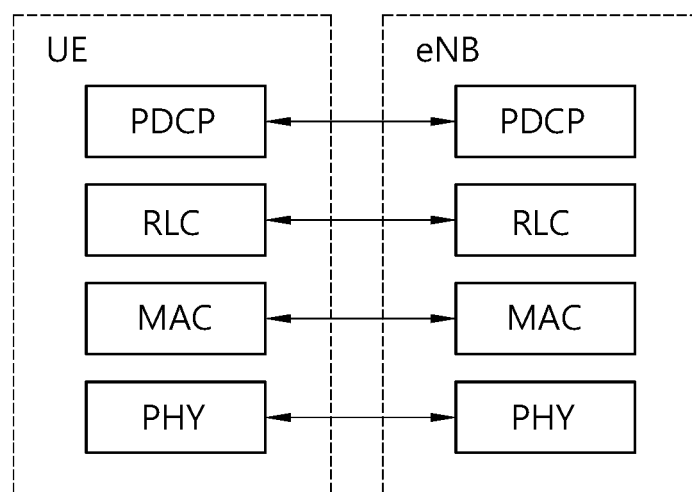
FIG. 2 shows a radio protocol architecture of a user plane in accordance with an embodiment of the present disclosure.
Figure 3:
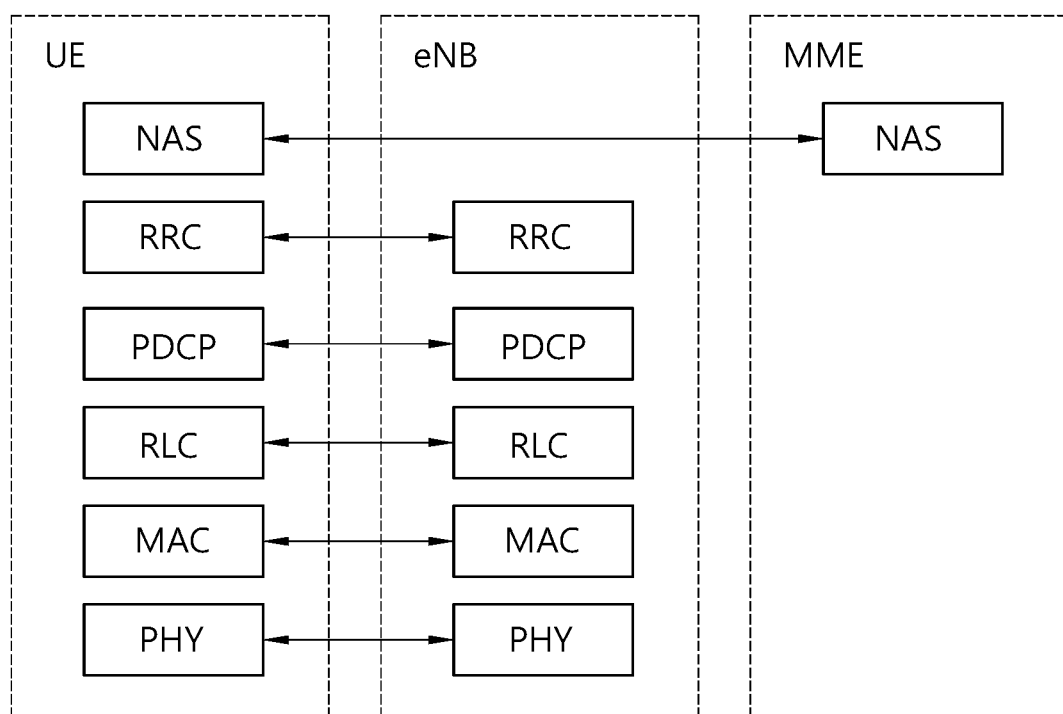
FIG. 3 shows a radio protocol architecture of a control plane in accordance with an embodiment of the present disclosure.

FIG. 2 shows a radio protocol architecture of a user plane in accordance with an embodiment of the present disclosure. FIG. 3 shows a radio protocol architecture of a control plane in accordance with an embodiment of the present disclosure. The user plane is a protocol stack for user data transmission, and the control plane is a protocol stack for control signal transmission.

Referring to FIG. 2 and FIG. 3, a physical (PHY) layer belongs to the L1. A physical (PHY) layer provides an information transfer service to a higher layer through a physical channel. The PHY layer is connected to a medium access control (MAC) layer. Data is transferred (or transported) between the MAC layer and the PHY layer through a transport channel. The transport channel is sorted (or categorized) depending upon how and according to which characteristics data is being transferred through the radio interface.

Between different PHY layers, i.e., a PHY layer of a transmitter and a PHY layer of a receiver, data is transferred through the physical channel. The physical channel may be modulated by using an orthogonal frequency division multiplexing (OFDM) scheme and uses time and frequency as radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure various quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

The radio resource control (RRC) layer is defined only in a control plane. And, the RRC layer performs a function of controlling logical channel, transport channels, and physical channels in relation with configuration, re-configuration, and release of radio bearers. The RB refers to a logical path being provided by the first layer (PHY layer) and the second layer (MAC layer, RLC layer, Packet Data Convergence Protocol (PDCP) layer) in order to transport data between the UE and the network.

Functions of a PDCP layer in the user plane include transfer, header compression, and ciphering of user data. Functions of a PDCP layer in the control plane include transfer and ciphering/integrity protection of control plane data.

The configuration of the RB refers to a process for specifying a radio protocol layer and channel properties in order to provide a particular service and for determining respective detailed parameters and operation methods. The RB may then be classified into two types, i.e., a signaling radio bearer (SRB) and a data radio bearer (DRB). The SRB is used as a path for transmitting an RRC message in the control plane, and the DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the base station is released.

Downlink transport channels transmitting (or transporting) data from a network to a UE include a Broadcast Channel (BCH) transmitting system information and a downlink Shared Channel (SCH) transmitting other user traffic or control messages. Traffic or control messages of downlink multicast or broadcast services may be transmitted via the downlink SCH or may be transmitted via a separate downlink Multicast Channel (MCH). Meanwhile, uplink transport channels transmitting (or transporting) data from a UE to a network include a Random Access Channel (RACH)

transmitting initial control messages and an uplink Shared Channel (SCH) transmitting other user traffic or control messages.

Logical channels existing at a higher level than the transmission channel and being mapped to the transmission channel may include a Broadcast Control Channel (BCCH), a Paging Control Channel (PCCH), a Common Control Channel (CCCH), a Multicast Control Channel (MCCH), a Multicast Traffic Channel (MTCH), and so on.

A physical channel is configured of a plurality of OFDM symbols in the time domain and a plurality of sub-carriers in the frequency domain. One subframe is configured of a plurality of OFDM symbols in the time domain. A resource block is configured of a plurality of OFDM symbols and a plurality of sub-carriers in resource allocation units. Additionally, each subframe may use specific sub-carriers of specific OFDM symbols (e.g., first OFDM symbol) of the corresponding subframe for a Physical Downlink Control Channel (PDCCH), i.e., L1/L2 control channels. A Transmission Ti me Interval (TTI) refers to a unit time of a subframe transmission.

Figure 4:
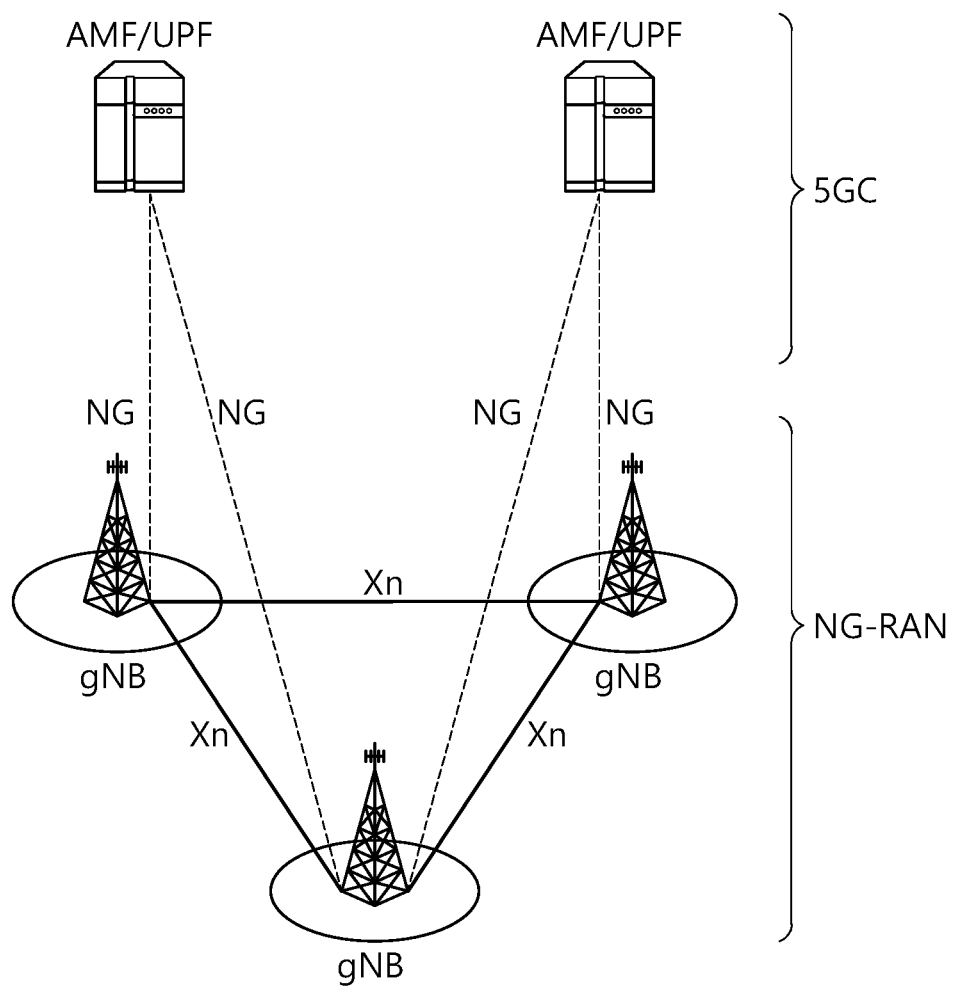
FIG. 4 shows a structure of an NR system in accordance with an embodiment of the present disclosure.

FIG. 4 shows a structure of an NR system in accordance with an embodiment of the present disclosure.

Referring to FIG. 4, a Next Generation—Radio Access Network (NG-RAN) may include a next generation-Node B (gNB) and/or eNB providing a user plane and control plane protocol termination to a user. FIG. 4 shows a case where the NG-RAN includes only the gNB. The gNB and the eNB are connected to one another via Xn interface. The gNB and the eNB are connected to one another via $5^{th}$ Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 5:
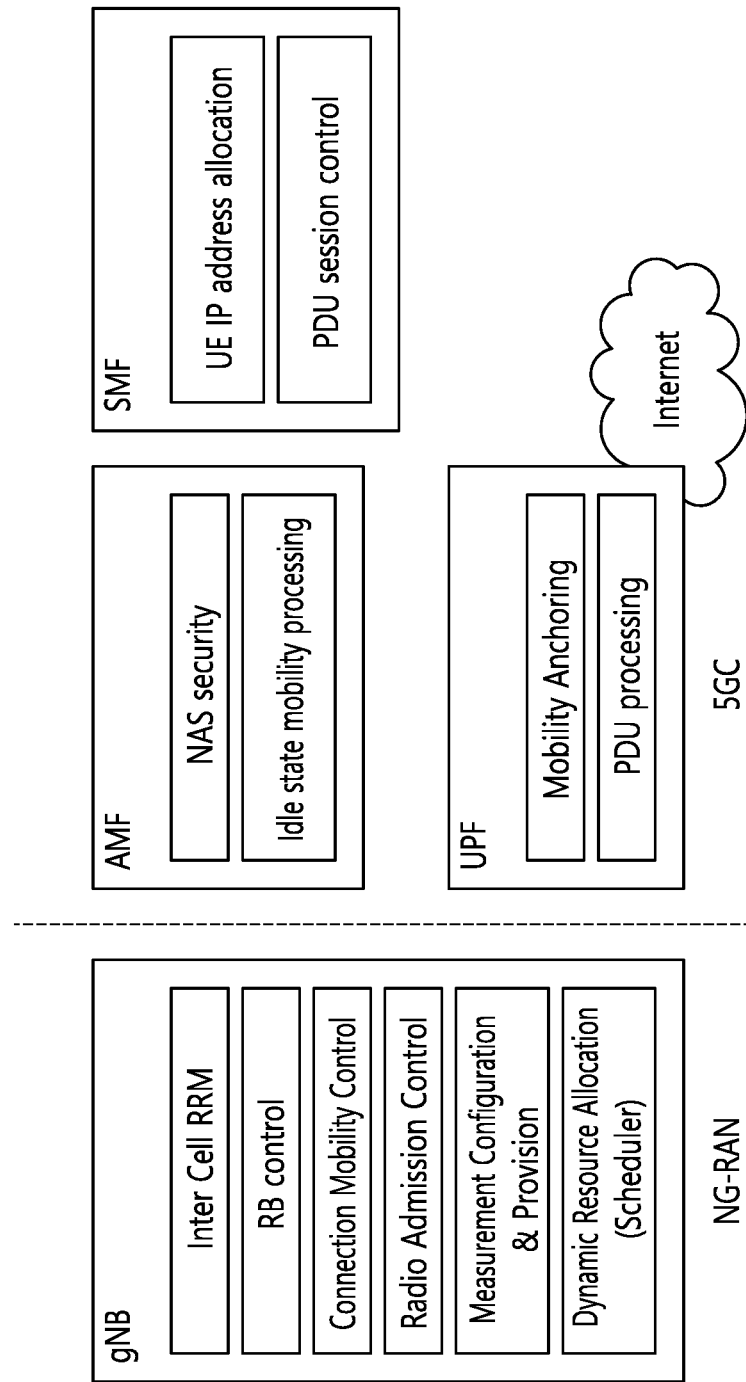
FIG. 5 shows a functional division between an NG-RAN and a 5GC in accordance with an embodiment of the present disclosure.

FIG. 5 shows a functional division between an NG-RAN and a 5GC in accordance with an embodiment of the present disclosure.

Referring to FIG. 5, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Figure 6:
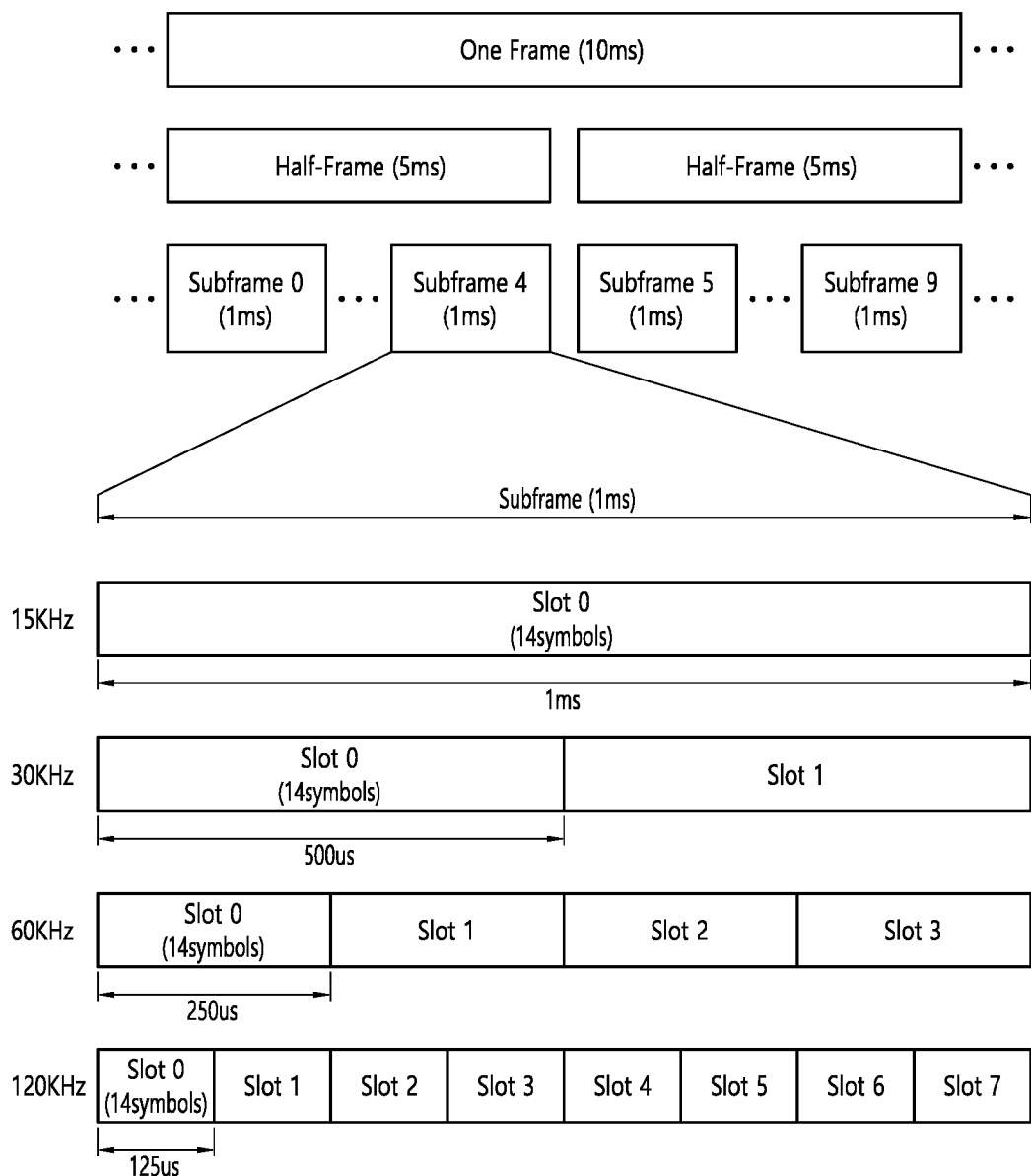
FIG. 6 shows a structure of a radio frame of an NR in accordance with an embodiment of the present disclosure.

FIG. 6 shows a structure of a radio frame of an NR in accordance with an embodiment of the present disclosure.

Referring to FIG. 6, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$) a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS (15 * $2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15 * $2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting various 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHZ | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 may include an unlicensed band. The unlicensed band may be used for various purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHZ | 60, 120, 240 kHz |

Figure 7:
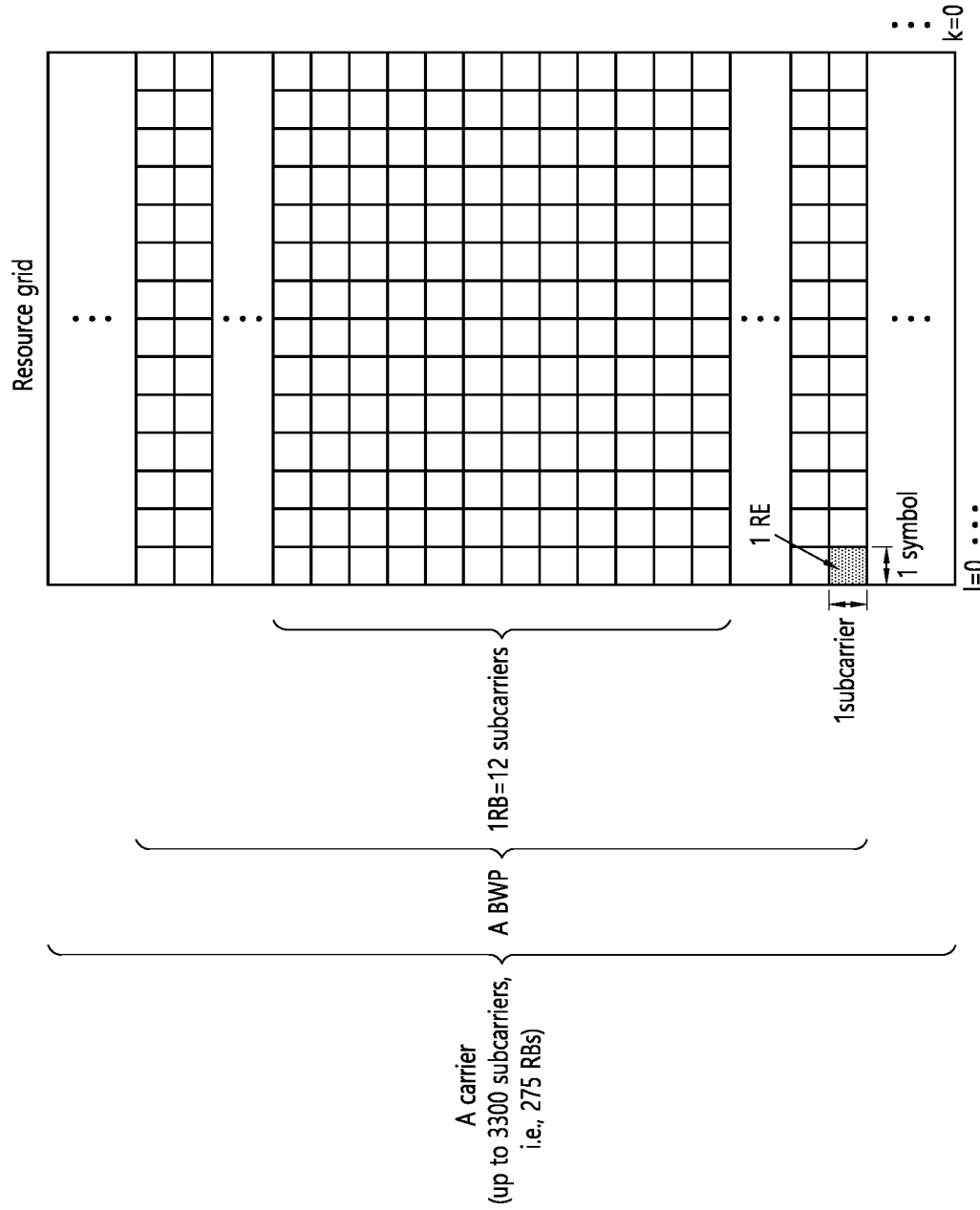
FIG. 7 shows a structure of a slot of an NR frame in accordance with an embodiment of the present disclosure.

FIG. 7 shows a structure of a slot of an NR frame in accordance with an embodiment of the present disclosure.

Referring to FIG. 7, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a Bandwidth Part (BWP) and a carrier will be described in detail.

The Bandwidth Part (BWP) may be a continuous set of physical resource blocks (PRBs) within a given numerology. The PRB may be selected from a continuous partial set of a common resource block (CRB) for a given numerology on a given carrier.

When using Bandwidth Adaptation (BA), a receiving bandwidth and a transmitting bandwidth of a user equipment (UE) are not required to be as wide (or large) as the bandwidth of the cell, and the receiving bandwidth and the transmitting bandwidth of the UE may be controlled (or adjusted). For example, the UE may receive information/configuration for bandwidth control (or adjustment) from a network/base station. In this case, the bandwidth control (or adjustment) may be performed based on the received information/configuration. For example, the bandwidth control (or adjustment) may include reduction/expansion of the bandwidth, position change of the bandwidth, or change in subcarrier spacing of the bandwidth.

For example, the bandwidth may be reduced during a duration with little activity in order to save power. For example, a position of the bandwidth may be relocated (or moved) from a frequency domain. For example, the position of the bandwidth may be relocated (or moved) from a frequency domain in order to enhance scheduling flexibility. For example, subcarrier spacing of the bandwidth may be changed. For example, the subcarrier spacing of the bandwidth may be changed in order to authorize different services. A subset of a total cell bandwidth of a cell may be referred to as a Bandwidth Part (BWP). BA may be performed when a base station/network configures BWPs to the UE, and when the base station/network notifies the BWP that is currently in an active state, among the BWPs, to the UE.

For example, the BWP may be one of an active BWP, an initial BWP, and/or a default BWP. For example, the UE may not monitor a downlink radio link quality in a DL BWP other than the active DL BWP within a primary cell (PCell). For example, the UE may not receive a PDCCH, a PDSCH or a CSI-RS (excluding only the RRM) from outside of the active DL BWP. For example, the UE may not trigger a Channel State Information (CSI) report for an inactive DL BWP. For example, the UE may not transmit a PUCCH or a PUSCH from outside of an inactive DL BWP. For example, in case of a downlink, an initial BWP may be given as a continuous RB set for an RMSI CORESET (that is configured by a PBCH). For example, in case of an uplink, an initial BWP may be given by a SIB for a random access procedure. For example, a default BWP may be configured by a higher layer. For example, an initial value of a default BWP may be an initial DL BWP. For energy saving, if the UE fails to detect DCI during a predetermined period of time, the UE may switch the active BWP of the UE to a default BWP.

Meanwhile, a BWP may be defined for the SL. The same SL BWP may be used for transmission and reception. For example, a transmitting UE may transmit an SL channel or SL signal within a specific BWP, and a receiving UE may receive an SL channel or SL signal within the same specific BWP. In a licensed carrier, the SL BWP may be defined separately from a Uu BWP, and the SL BWP may have a separate configuration signaling from the Uu BWP. For example, the UE may receive a configuration for an SL BWP from the base station/network. The SL BWP may be configured (in advance) for an out-of-coverage N R V2X UE and an RRC_IDLE UE. For a UE operating in the RRC_CONNECTED mode, at least one SL BWP may be activated within a carrier.

Figure 8:
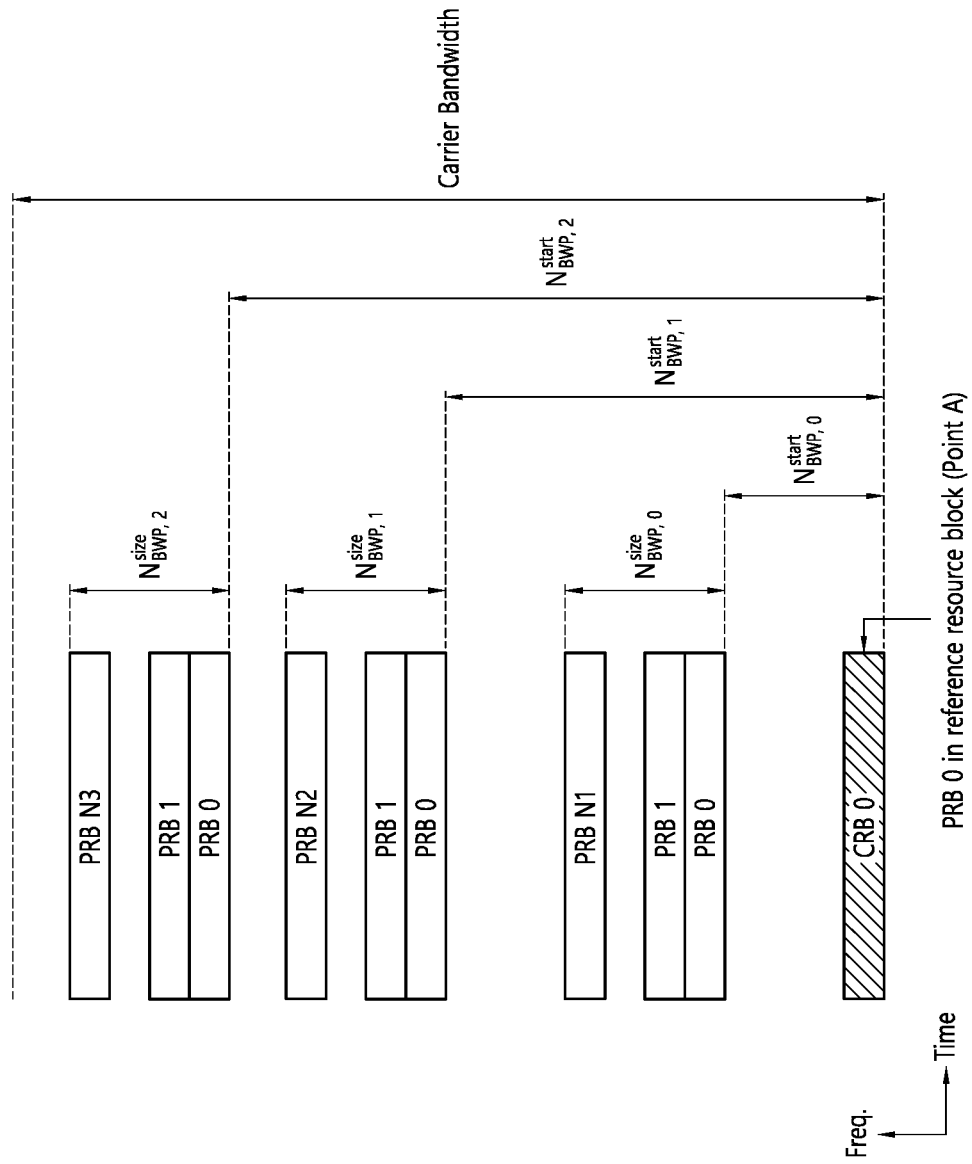
FIG. 8 shows an example of a BWP in accordance with an embodiment of the present disclosure.

FIG. 8 shows an example of a BWP in accordance with an embodiment of the present disclosure. In the embodiment of FIG. 8, it is assumed that three BWPs exist.

Referring to FIG. 8, a common resource block (CRB) may be a carrier resource block that is numerated from one end of a carrier band to another end. And, a PRB may be a resource block that is numerated within each BWP. Point A may indicate a common reference point for a resource block grid.

A BWP may be configured by Point A, an offset ($N^{start}_{BWP}$) from Point A, and a bandwidth ($N^{size}_{BWP}$). For example, Point A may be an external reference point of a PRB of a carrier having subcarrier 0 of all numerologies (e.g., all numerologies being supported by the network within the corresponding carrier) aligned therein. For example, the offset may be a PRB distance between a lowest subcarrier within a given numerology and Point A. For example, the bandwidth may be a number of PRBs within the given numerology.

Hereinafter, V2X or SL communication will be described.

Figure 9:
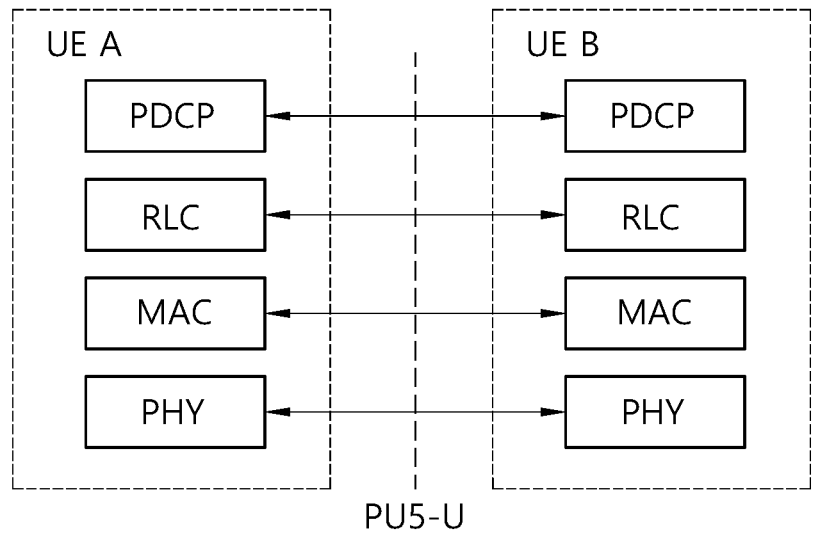
FIG. 9 shows a protocol stack for a SL communication in accordance with an embodiment of the present disclosure.
Figure 9:
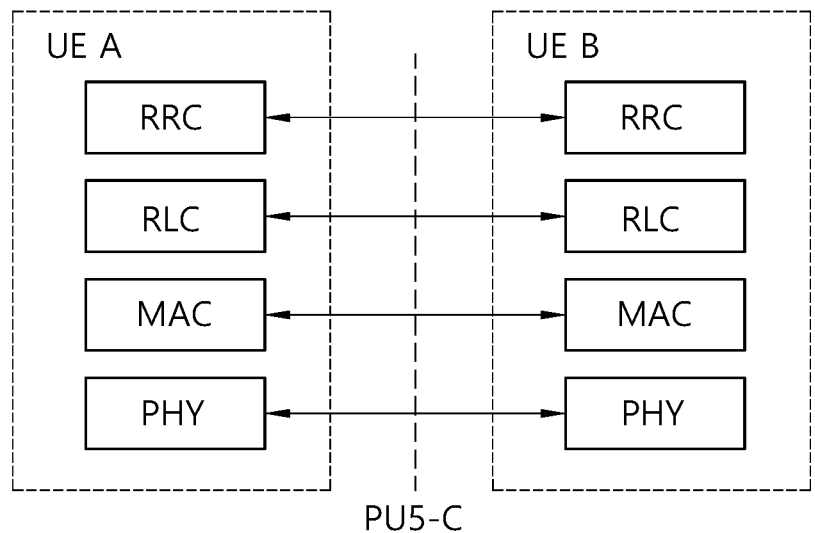

FIG. 9 shows a protocol stack for a SL communication in accordance with an embodiment of the present disclosure. More specifically, (a) of FIG. 9 shows a user plane protocol stack of LTE, and (b) of FIG. 9 shows a control plane protocol stack of LTE.

Figure 10:
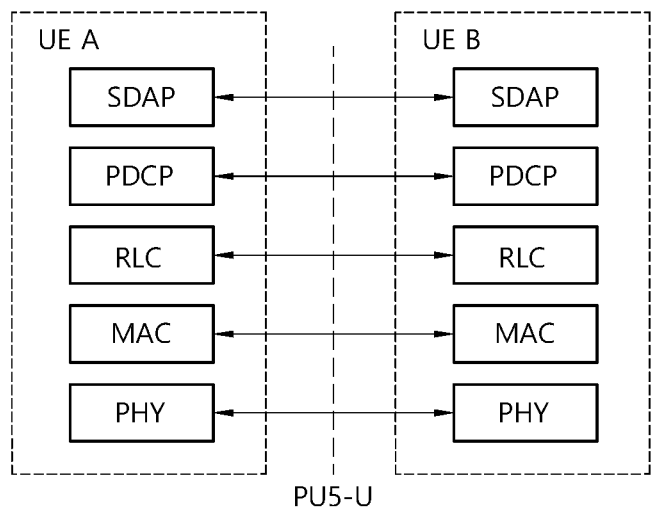
FIG. 10 shows a protocol stack for a SL communication in accordance with an embodiment of the present disclosure.
Figure 10:
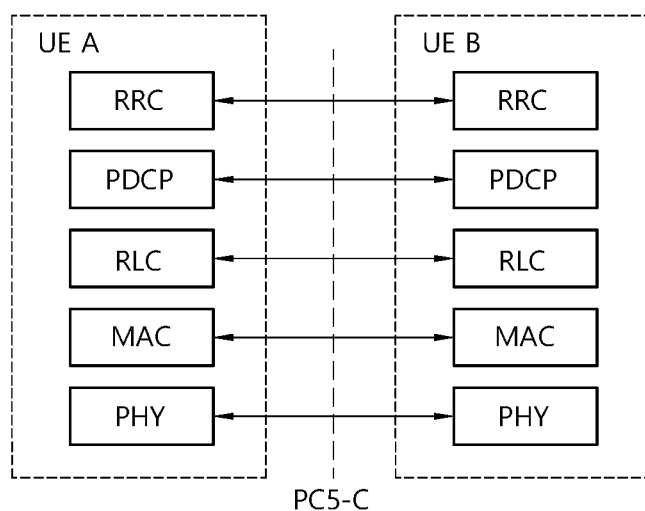

FIG. 10 shows a protocol stack for a SL communication in accordance with an embodiment of the present disclosure. More specifically, (a) of FIG. 10 shows a user plane protocol stack of NR, and (b) of FIG. 10 shows a control plane protocol stack of NR.

Hereinafter, SL Synchronization Signal (SLSS) and synchronization information will be described.

SLSS is a SL specific sequence, which may include a Primary Sidelink Synchronization Signal (PSSS) and a Secondary Sidelink Synchronization Signal (SSSS). The PSSS may also be referred to as a Sidelink Primary Synchronization Signal (S-PSS), and the SSSS may also be referred to as a Sidelink Secondary Synchronization Signal (S-SSS).

A Physical Sidelink Broadcast Channel (PSBCH) may be a (broadcast) channel through which basic (system) information that should first be known by the user equipment (UE) before transmitting and receiving SL signals. For example, the basic information may be information related to SLSS, a Duplex mode (DM), Time Division Duplex Uplink/Downlink (TDD UL/DL) configuration, information related to a resource pool, application types related to SLSS, a subframe offset, broadcast information, and so on.

The S-PSS, the S-SSS, and the PSBCH may be included in a block format (e.g., a SL SS/PSBCH block, hereinafter referred to as Sidelink-Synchronization Signal Block (S-SSB)). The S-SSB may have the same numerology (i.e., SCS and CP length) as a Physical Sidelink Control Channel (PSCCH)/Physical Sidelink Shared Channel (PSSCH) within the carrier, and a transmission bandwidth may exist within a (pre-)configured SL Bandwidth Part (BWP). And, a frequency position of the S-SSB may be (pre-)configured. Therefore, the UE is not required to perform a hypothesis detection in order to discover the S-SSB in the carrier.

Each SLSS may have a physical layer SL synchronization identity (ID), and the respective value may be equal to any one value ranging from 0 to 335. Depending upon one of the above-described values that is used, a synchronization source may also be identified. For example, values of 0, 168, 169 may indicate global navigation satellite systems (GNSS), values from 1 to 167 may indicate base stations, and values from 170 to 335 may indicate that the source is outside of the coverage. Alternatively, among the physical layer SL synchronization ID values, values 0 to 167 may be values being used by a network, and values from 168 to 335 may be values being used outside of the network coverage.

Figure 11:
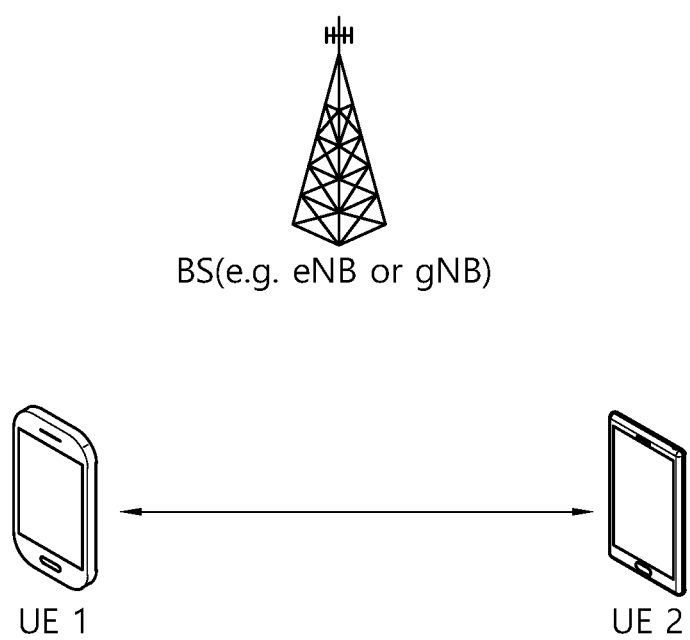
FIG. 11 shows a UE performing V2X or SL communication in accordance with an embodiment of the present disclosure.

FIG. 11 shows a UE performing V2X or SL communication in accordance with an embodiment of the present disclosure.

Referring to FIG. 11, in V2X/SL communication, the term terminal may mainly refer to a terminal (or equipment) used by a user. However, in case a network equipment, such as a base station, transmits and receives signals in accordance with a communication scheme between the network equipment and a user equipment (UE) (or terminal), the base station may also be viewed as a type of user equipment (or terminal).

User equipment 1 (UE1) may select a resource unit corresponding to a specific resource within a resource pool, which refers to a set of resources, and UE1 may then be operated so as to transmit a SL signal by using the corresponding resource unit. User equipment 2 (UE2), which is to a receiving UE, may be configured with a resource pool to which UE1 can transmit signals, and may then detect signals of UE1 from the corresponding resource pool.

Herein, in case UE1 is within a connection range of the base station, the base station may notify the resource pool. Conversely, in case UE1 is outside a connection range of the base station, another UE may notify the resource pool or a pre-determined resource may be used.

Generally, a resource pool may be configured in a plurality of resource units, and each UE may select one resource unit or a plurality of resource units and may use the selected resource unit(s) for its SL signal transmission.

Figure 12:
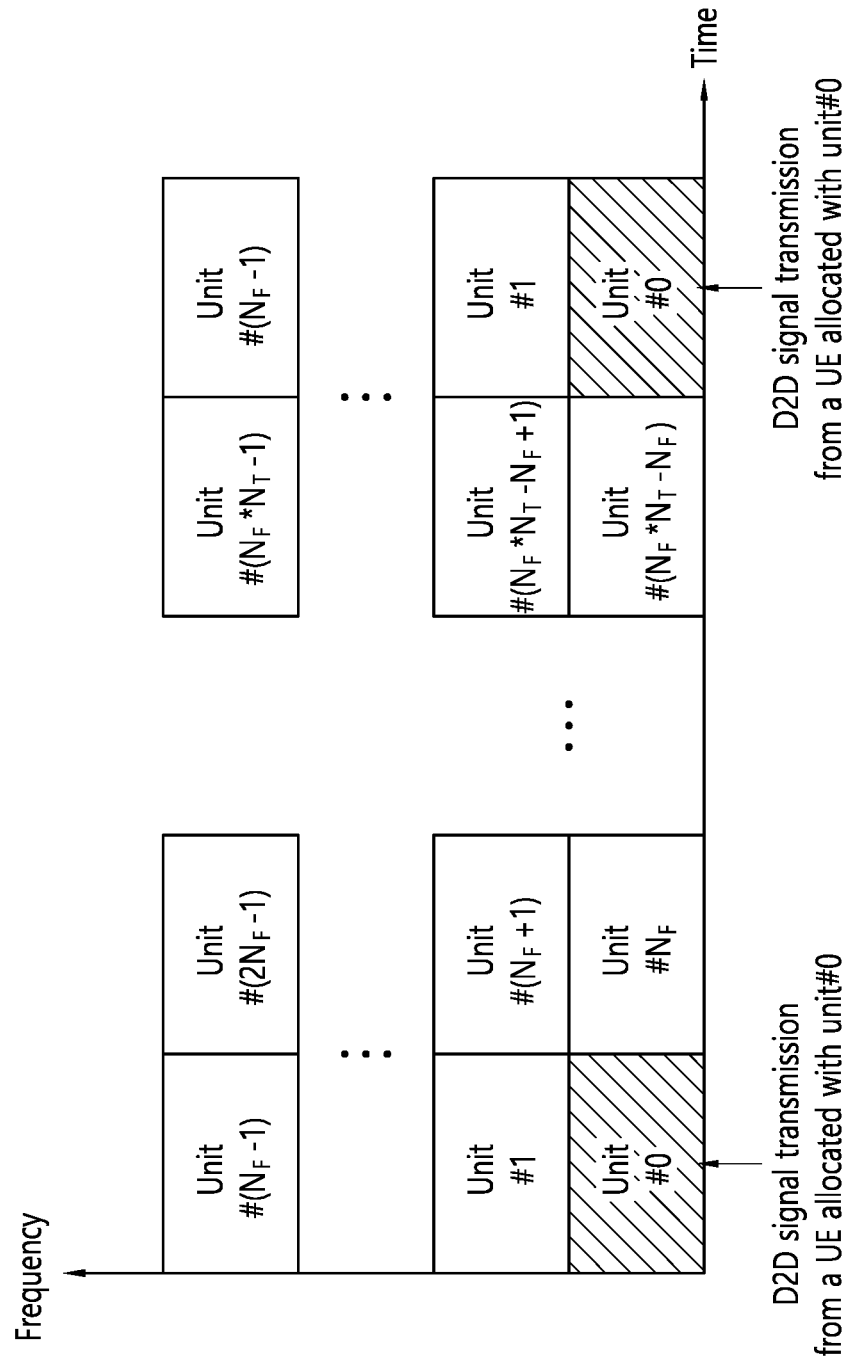
FIG. 12 shows a resource unit for V2X or SL communication in accordance with an embodiment of the present disclosure.

FIG. 12 shows a resource unit for V2X or SL communication in accordance with an embodiment of the present disclosure.

Referring to FIG. 12, the total frequency resources of the resource pool may be divided into $N_F$ number of resource units, the total time resources of the resource pool may be divided into $N_T$ number of resource units. Therefore, a total of $N_F*N_T$ number of resource units may be defined in the resource pool. FIG. 12 shows an example of a case where the corresponding resource pool is repeated at a cycle of $N_T$ number of subframes.

As shown in FIG. 12, one resource unit (e.g., Unit #0) may be periodically and repeatedly indicated. Alternatively, in order to achieve a diversity effect in the time or frequency level (or dimension), an index of a physical resource unit to which a logical resource unit is mapped may be changed to a pre-determined pattern in accordance with time. In such resource unit structure, the resource pool may refer to a set of resource units that can be used for a transmission that is performed by a user equipment (UE), which intends to transmit SL signals.

The resource pool may be segmented to multiple types. For example, depending upon the content of a SL signal being transmitted from each resource pool, the resource pool may be divided as described below.

(1) Scheduling Assignment (SA) may be a signal including information, such as a position of a resource that is used for the transmission of a SL data channel, a Modulation and Coding Scheme (MCS) or Multiple Input Multiple Output (MIMO) transmission scheme needed for the modulation of other data channels, a Timing Advance (TA), and so on. The SA may also be multiplexed with SL data within the same resource unit and may then be transmitted, and, in this case, an SA resource pool may refer to a resource pool in which the SA is multiplexed with the SL data and then transmitted. The SA may also be referred to as a SL control channel.

(2) A Physical Sidelink Shared Channel (PSSCH) may be a resource pool that is used by a transmitting UE for transmitting user data. If the SA is multiplexed with SL data within the same resource unit and then transmitted, only a SL data channel excluding the SA information may be transmitted from the resource pool that is configured for the SL data channel. In other words, REs that were used for transmitting SA information within a separate resource unit of the SA resource pool may still be used for transmitting SL data from the resource pool of a SL data channel.

(3) A discovery channel may be a resource pool that is used by the transmitting UE for transmitting information, such as its own ID. By doing so, the transmitting UE may allow a neighboring UE to discover the transmitting UE.

Even if the content of the above-described SL signal is the same, different resource pools may be used depending upon the transmission/reception attribute of the SL signal. For example, even if the same SL data channel or discovery message is use d, the resource pool may be identified as a different resource pool depending upon a transmission timing decision method (e.g., whether the transmission is performed at a reception point of the synchronization reference signal or whether transmission is performed at the reception point by applying a consistent timing advance), a resource allocation method (e.g., whether the base station designates a transmission resource of a separate signal to a separate transmitting UE or whether a separate transmitting UE selects a separate signal transmission resource on its own from the resource pool), and a signal format (e.g., a number of symbols occupied by each SL signal within a subframe or a number of subframes being used for the transmission of one SL signal) of the SL signal, signal intensity from the base station, a transmitting power intensity (or level) of a SL UE, and so on.

Hereinafter, resource allocation in a SL will be described.

Figure 13:
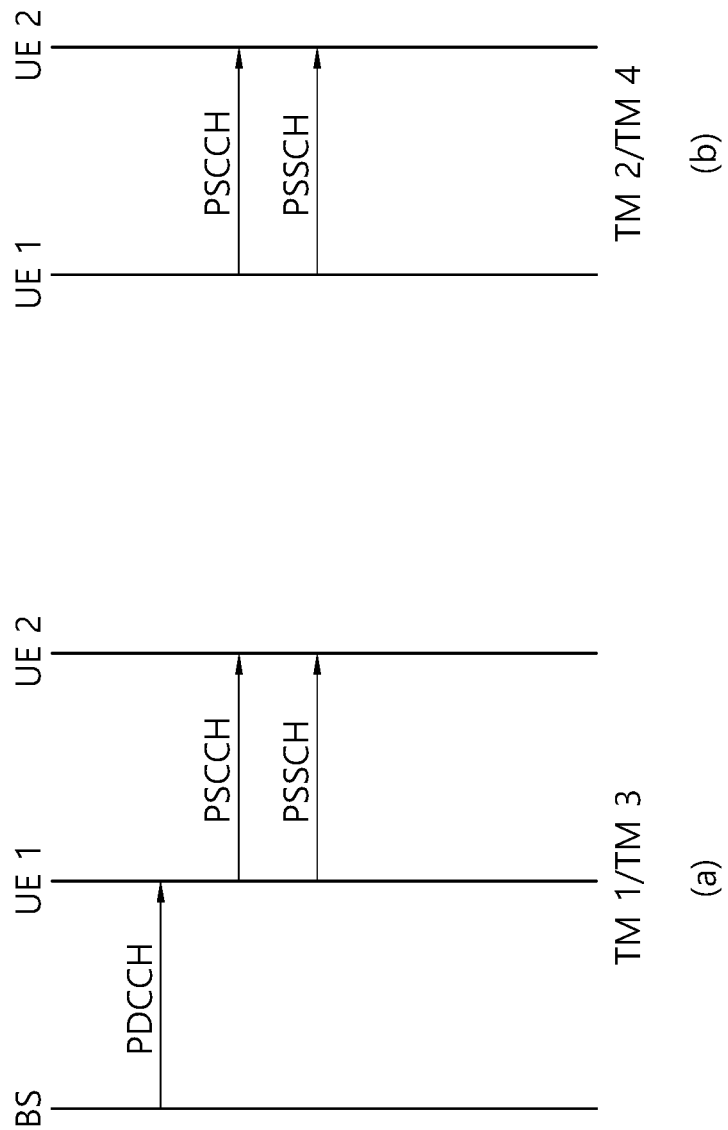
FIG. 13 shows procedures of a UE performing V2X or SL communication according to a transmission mode (TM) in accordance with an embodiment of the present disclosure.

FIG. 13 shows procedures of a UE performing V2X or SL communication according to a transmission mode (TM) in accordance with an embodiment of the present disclosure. Specifically, (a) of FIG. 13 shows a UE operation related to a transmission mode 1 or a transmission mode 3, and (b) of FIG. 13 shows a UE operation related to a transmission mode 2 or a transmission mode 4.

Referring to (a) of FIG. 13, in transmission modes 1/3, the base station performs resource scheduling to UE1 via PDCCH (more specifically, Downlink Control Information (DCI)), and UE1 performs SL/V2X communication with UE2 according to the corresponding resource scheduling. After transmitting sidelink control information (SCI) to UE2 via physical sidelink control channel (PSCCH), UE1 may transmit data based on the SCI via physical sidelink shared channel (PSSCH). In case of an LTE SL, transmission mode 1 may be applied to a general SL communication, and transmission mode 3 may be applied to a V2X SL communication.

Referring to (b) of FIG. 13, in transmission modes 2/4, the UE may schedule resources on its own. More specifically, in case of LTE SL, transmission mode 2 may be applied to a general SL communication, and the UE may select a resource from a predetermined resource pool on its own and may then perform SL operations. Transmission mode 4 may be applied to a V2X SL communication, and the UE may carry out a sensing/SA decoding procedure, and so on, and select a resource within a selection window on its own and may then perform V2X SL operations. After transmitting the SCI to UE2 via PSCCH, UE1 may transmit SCI-based data via PSSCH. Hereinafter, the transmission mode may be abbreviated to the term mode.

In case of NR SL, at least two types of SL resource allocation modes may be defined. In case of mode 1, the base station may schedule SL resources that are to be used for SL transmission. In case of mode 2, the user equipment (UE) may deter mine a SL transmission resource from SL resources that are configured by the base station/network or predetermined SL resources. The configured SL resources or the pre-determined SL resources may be a resource pool. For example, in case of mode 2, the UE may autonomously select a SL resource for transmission. For example, in case of mode 2, the UE may assist (or help) SL resource selection of another UE. For example, in case of mode 2, the UE may be configured with an NR configured grant f or SL transmission. For example, in case of mode 2, the UE may schedule SL transmission of another UE. And, mode 2 may at least support reservation of SL resources for blind retransmission.

Procedures related to sensing and resource (re-)selection may be supported in resource allocation mode 2. The sensing procedure may be defined as a process decoding the SCI from another UE and/or SL measurement. The decoding of the SCI in the sensing procedure may at least provide information on a SL resource that is being indicated by a UE transmitting the SCI. When the corresponding SCI is decoded, the sensing procedure may use L1 SL Reference Signal Received Power (RSRP) measurement, which is based on SL Demodulation Reference Signal (DMRS). The resource (re-)selection procedure may use a result of the sensing procedure in order to determine the resource for the SL transmission.

Figure 14:
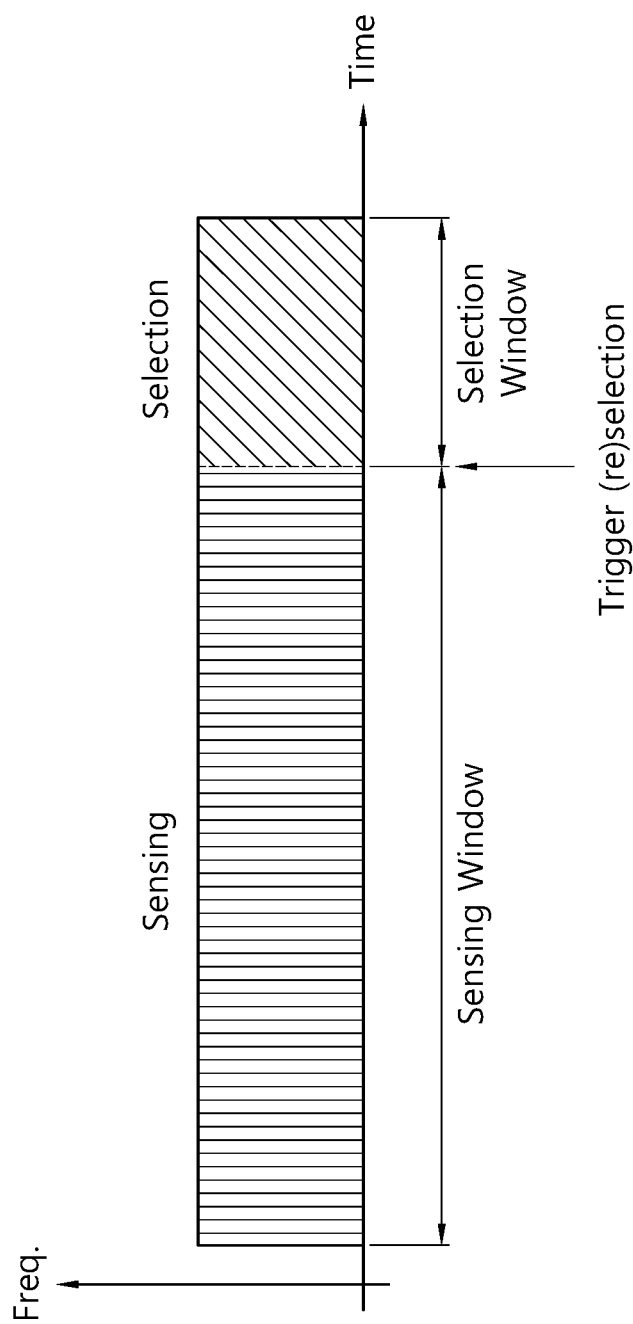
FIG. 14 shows a method of selecting a transmission resource by a UE in accordance with an embodiment of the present disclosure.

FIG. 14 shows a method of selecting a transmission resource by a UE in accordance with an embodiment of the present disclosure.

Referring to FIG. 14, the UE may identify transmission resources reserved by another UE or resources being used by another UE via sensing within a sensing window, and, after excluding the identified resources from a selection window, the UE may randomly select a resource from resources having low interference among the remaining resources.

For example, within the sensing window, the UE may decode the PSCCH including information on the cycles of the reserved resources, and, then, the UE may measure a PSSCH RSRP from resources that are periodically determined based on the PSCCH. The UE may exclude resources having the PSSCH RSRP that exceeds a threshold value from the selection window. Thereafter, the UE may randomly select a SL resource from the remaining resources within the selection window.

Alternatively, the UE may measure a Received Signal Strength Indicator (RSSI) of the periodic resources within the sensing window and may then determine the re sources having low interference (e.g., the lower 20% of the resources). Additionally, the UE may also randomly select a SL resource from the resources included in the selection window among the periodic resources. For example, in case the UE fails to perform decoding of the PSCCH, the UE may use the above described methods.

Hereinafter, a hybrid automatic repeat request (HARQ) procedure will be described.

An error compensation scheme for securing communication reliability may include a Forward Error Correction (FEC) scheme and an Automatic Repeat Request (ARQ) scheme. In the FEC scheme, errors in a receiver are corrected by attaching an extra error correction code to information bits. The FEC scheme has an advantage in that time delay is small and no information is additionally exchanged between a transmitter and the receiver. However, the FEC scheme also has a disadvantage in that system efficiency is degraded in a good channel environment. The ARQ scheme has an advantage in that transmission reliability can be increased. However, the ARQ scheme also has a disadvantage in that a time delay occurs and system efficiency is degraded in a poor channel environment.

A hybrid automatic repeat request (HARQ) scheme is a combination of the FEC scheme and the ARQ scheme. And, herein, it is determined whether or not a non-decodable error is included in data received by a physical layer, and by requesting retransmission upon detecting the error, performance may be enhanced.

In case of SL unicast and groupcast, HARQ feedback and HARQ combining within the physical layer may be supported. For example, when a receiving UE operates in Resource Allocation Mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

When the SL HARQ feedback is enabled for unicast, in a non-code block group (non-CBG) operation, if the receiving UE successfully decodes a corresponding transport block, the receiving UE may generate HARQ-ACK. Thereafter, the receiving UE may transmit the HARQ-ACK to the transmitting UE. If the receiving UE fails to successfully decode the transport block after decoding the PSCCH, which targets the receiving UE, the receiving UE may generate the HARQ-NACK. Thereafter, the receiving UE may transmit the HARQ-NACK to the transmitting UE.

When the SL HARQ feedback is enabled for groupcast, the UE may determine whether or not to transmit HARQ feedback based on a transmission-reception (TX-RX) distance and/or RSRP. In the non-CBG operation, two HARQ feedback options may be supported for groupcast.

(1) Option 1: After the receiving UE decodes an associated PSCCH, if the receiving UE fails to decode the corresponding transport block, the receiving UE may transmit an HARQ-NACK on the PSFCH. Otherwise, the receiving UE may not transmit a signal on the PSFCH.

(2) Option 2: If the receiving UE successfully decodes the corresponding transport block, the receiving UE may transmit an HARQ-NACK on the PSFCH. After the receiving UE decodes an associated PSCCH targeting the receiving UE, if the receiving UE fails to successfully decode the corresponding transport block, the receiving UE may transmit an HARQ-NACK on the PSFCH.

In case of Resource Allocation Mode 1, a time between the HARQ feedback transmission on the PSFCH and the PSSCH may be (pre-)configured. In case of unicast and groupcast, if retransmission is needed in the sidelink, this may be indicated to the base station, by a UE existing within a coverage, by using a PUCCH. The transmitting UE may also transmit an indication to a service base station of the transmitting UE in the form of a Scheduling Request (SR)/Buffer Status Report (BSR) and not in the form of an HARQ ACK/NACK. Additionally, even if the base station does not receive the indication, the base station may schedule a sidelink retransmission resource to the UE.

In case of Resource Allocation Mode 2, a time between the HARQ feedback transmission on the PSFCH and the PSSCH may be (pre-)configured.

Hereinafter, a Sidelink Received Signal Strength Indicator (S-RSSI), a PSSCH Reference Signal Received Power (PSSCH-RSRP), a Channel Busy Ratio (CBR), and a Channel Occupancy Ratio (CR) will be described. Meanwhile, the following definition and description are merely exemplary. And, therefore, apart from the contents presented below, the aforementioned terms may be variously defined.

<S-RSSI>

Sidelink RSSI (S-RSSI) may be defined as the linear average of the total received power (in [W]) per SC-FDMA symbol observed by the UE only in the configured sub-channel in SC-FDMA symbols 1, 2, . . . , 6 of the first slot and SC-FDMA symbols 0, 1, . . . , 5 of the second slot of a subframe.

Herein, the reference point for the S-RSSI may be the antenna connector of the UE.

If receiver diversity is in use by the UE, the reported value may not be lower than the corresponding S-RSSI of any of the individual diversity branches.

S-RSSI is applicable for RRC_IDLE intra-frequency, RRC_IDLE inter-frequency, RRC_CONNECTED intra-frequency, and/or RRC_CONNECTED inter-frequency.

<PSSCH-RSRP>

PSSCH Reference Signal Received Power (PSSCH-RSRP) may be defined as the linear average over the power contributions (in [W]) of the resource elements that carry demodulation reference signals associated with PSSCH, within the PRBs indicated by the associated PSCCH.

Herein, the reference point for the PSSCH-RSRP may be the antenna connector of the UE.

If receiver diversity is in use by the UE, the reported value may not be lower than the corresponding PSSCH-RSRP of any of the individual diversity branches.

PSSCH-RSRP is applicable for RRC_IDLE intra-frequency, RRC_IDLE inter-frequency, RRC_CONNECTED intra-frequency, and/or RRC_CONNECTED inter-frequency.

Herein, the power per resource element may be determined from the energy received during the useful part of the symbol, excluding the CP.

<CBR>

Channel busy ratio (CBR) measured in subframe n is defined as follows.

For PSSCH, CBR may be the portion of sub-channels in the resource pool whose S-RSSI measured by the UE exceed a (pre-)configured threshold sensed over subframes [n−100, n−1].

For PSCCH, in a pool (pre)configured such that PSCCH may be transmitted with its corresponding PSSCH in non-adjacent resource blocks, CBR may be the portion of the resources of the PSCCH pool whose S-RSSI measured by the UE exceed a (pre-)configured threshold sensed over subframes [n−100, n−1], assuming that the PSCCH pool is composed of resources with a size of two consecutive PRB pairs in the frequency domain.

CBR is applicable for RRC_IDLE intra-frequency, RRC_IDLE inter-frequency, RRC_CONNECTED intra-frequency, and/or RRC_CONNECTED inter-frequency.

Herein, the subframe index may be based on physical subframe index.

<CR>

Channel occupancy ratio (CR) evaluated at subframe n may be defined as follows.

CR may be the total number of sub-channels used for its transmissions in subframes [n−a, n−1] and granted in subframes [n, n+b] divided by the total number of configured sub-channels in the transmission pool over [n−a, n+b].

CR is applicable for RRC_IDLE intra-frequency, RRC_IDLE inter-frequency, RRC_CONNECTED intra-frequency, and/or RRC_CONNECTED inter-frequency.

Herein, a may be a positive integer and b may be 0 or a positive integer. a and b may be determined by UE implementation with a+b+1=1000, a>=500, and n+b should not exceed the last transmission opportunity of the grant for the current transmission.

Herein, CR may be evaluated for each (re)transmission.

Herein, in evaluating CR, the UE may assume the transmission parameter used at subframe n is reused according to the existing grant(s) in subframes [n+1, n+b] without packet dropping.

Herein, the subframe index may be based on physical subframe index.

Herein, CR can be computed per priority level.

Hereinafter, the proposal of the present disclosure will be described in more detail.

Figure 15:
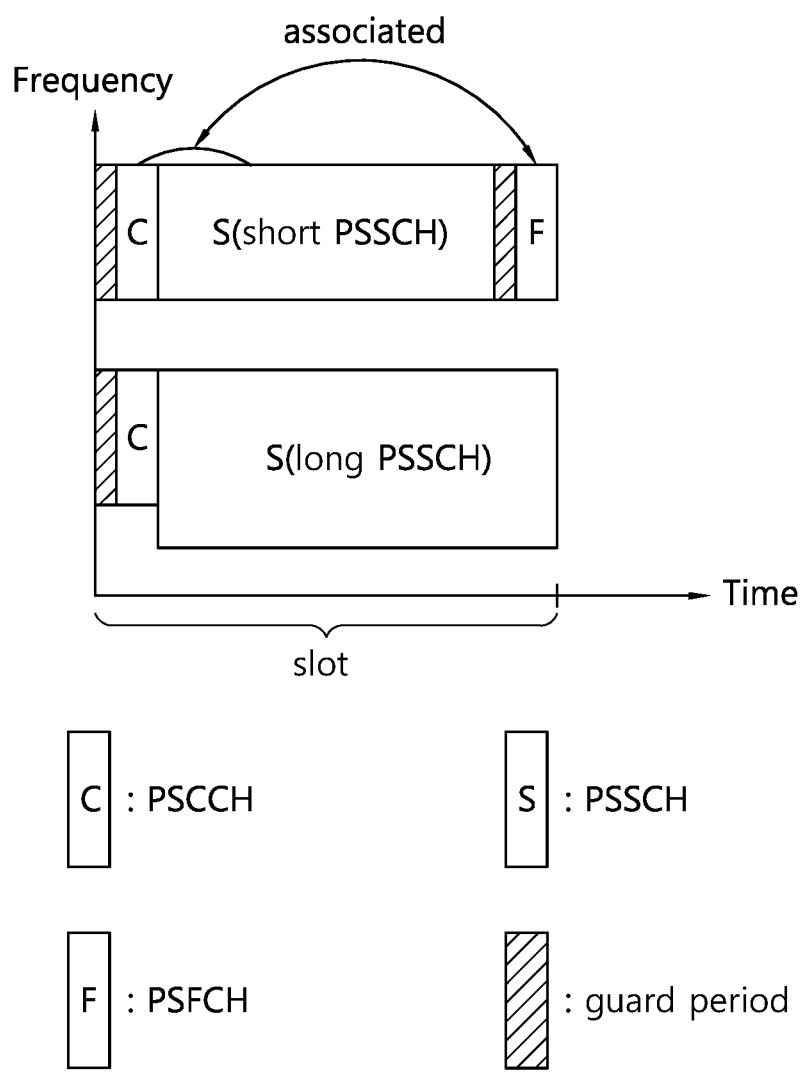
FIG. 15 shows an example of multiple sidelink channels being allocated on a time/frequency resource.
Figure 16:
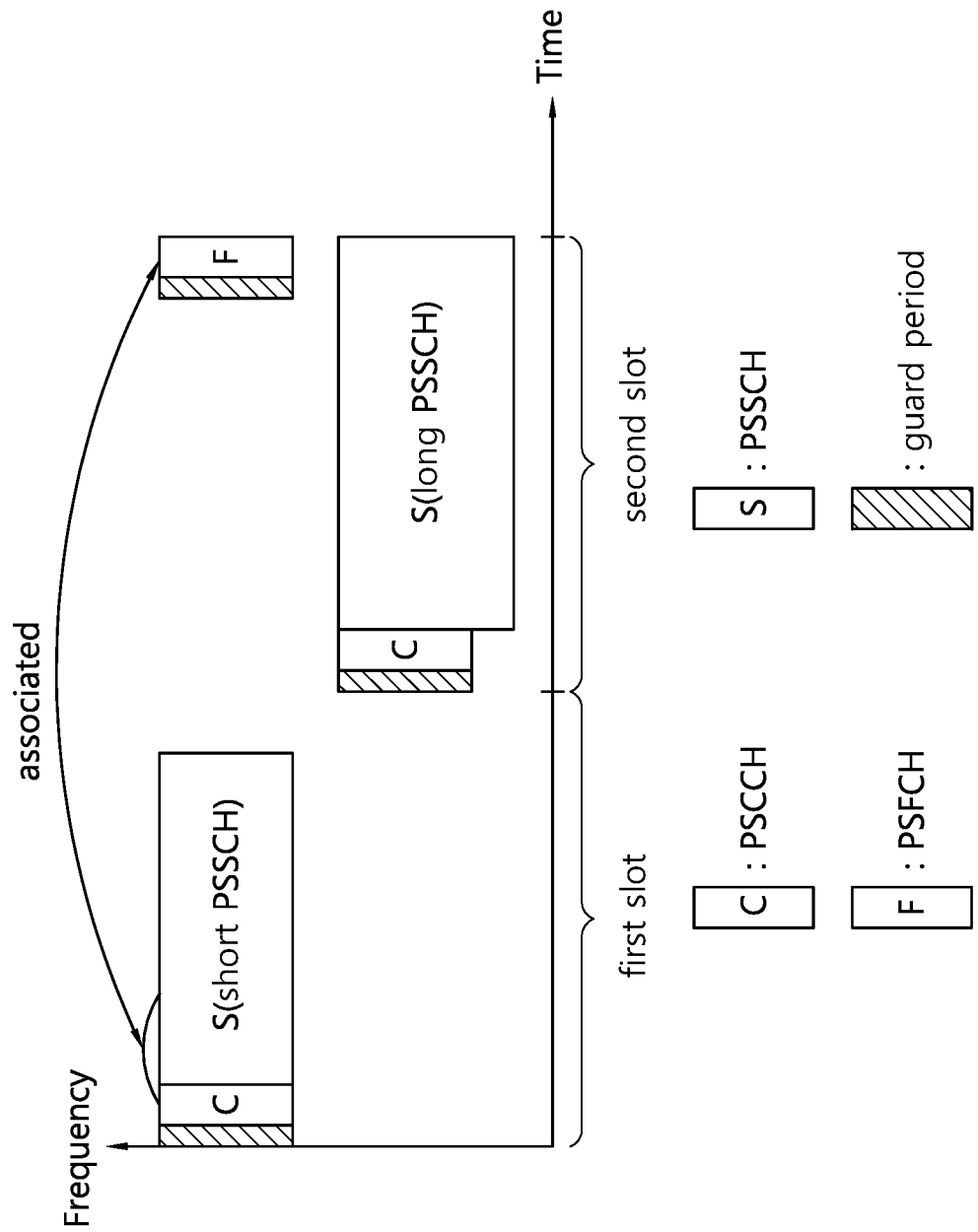
FIG. 16 shows another example of multiple sidelink channels being allocated on a time/frequency resource.

In sidelink (SL), a physical sidelink feedback channel (PSFCH) for transmitting feedback information from a receiver to a transmitter may be defined. The transmitter transmits a PSCCH including scheduling information that is needed for decoding a PSSCH, which transports user data. The receiver may transmit a PSFCH in order to transmit feedback information, such as HARQ-ACK or CSI, and so on. Since the size of the feedback information is not very large, a small number of symbols within a slot may be used for the PSFCH. Since the PSFCH including HARQ-ACK may be generated after decoding the associated PSCCH and PSSCH, PSFCH resource may appear after the PSCCH/PSSCH. In case fast decoding can be performed by the receiving UE, the PSFCH may appear only in a same slot as the associated PSCCH/PSSCH. However, in case a longer decoding time is needed, another slot may be used. FIG. 15 and FIG. 16 respectively show general examples for both cases.

In a scenario where multiple UEs transmit sidelink channels, the length of a PSSCH in a time domain may vary depending upon, for example, whether or not each UE uses a PSFCH. If different channel lengths are multiplexed in a single resource pool, this may cause resource inefficiency, such as additional automatic gain control (AGC). Therefore, it may be preferable to separate a resource pool region in accordance with different PSSCH lengths, so that a same PSSCH length may be indicated in a single resource pool. However, for example, in case a larger number of UEs wish to use short PSSCHs in order to use the PSFCH, a hard resource pool separation may cause resource fragmentation and inefficiency.

In other words, PSSCHs each having a different length may be transmitted on a single resource pool. For example, as described above, in case PSFCH allocation is allowed within a single slot, the PSSCHs may not be allocated as much as the corresponding time resource. However, in case the PSFCH allocation is not allowed within a single slot, the PSSCHs may be allocated as much as the corresponding time resource. A PSSCH for the former case may be referred to as a short PSSCH, and a PSSCH for the latter case may be referred to as a long PSSCH.

In this case, for example, the PSFCH may be transmitted after short PSSCH transmission. At a time point where the PSFCH is transmitted, a long PSSCH may be transmitted on a frequency domain resource that is different from a frequency domain resource to which the short PSSCHs are allocated. Such channels may be multiplexed and then transmitted.

In this case, for example, in case of a UE that receives a PSSCH having a relatively long length, a power change of a reception signal may be detected by the UE, due to the presence of a PSFCH that is not received by the corresponding UE at a specific time point. And, accordingly, an additional AGC operation may need to be performed. Due to such additional AGC operation, as described above, degradation may occur in reception accuracy of a signal, which is intended to be received by the UE during a time period wherein the AGC operation is performed.

Accordingly, the following method may be considered.

Each resource pool has an allowable/allowed PSSCH length or a parameter determining a symbol position where a PSSCH equally ends, and only the allowable PSSCH length may be transmitted from the resource pool. Each UE may basically determine a PSSCH length based on a PSFCH usage (or preferred PSSCH length) and may use a resource pool where the preferred PSSCH length is allowed. However, in some exceptional cases, the UE may change the PSSCH length to a non-preferred PSSCH length and may use a resource pool in which the non-preferred PSSCH length is allowed. Such exceptional cases may include a case where a high congestion is observed in the resource pool where preferred PSSCH length is allowed, a case where latency requirements are not satisfied within the resource pool where is preferred PSSCH length is allowed, and so on. Meanwhile, information on an allowed PSSCH length or parameter determining a symbol position where a PSSCH equally ends within each resource pool, or information on allocation or non-allocation and allocation position of PSFCH for each resource pool may be transmitted to the UE through a resource pool configuration information.

Figure 18:
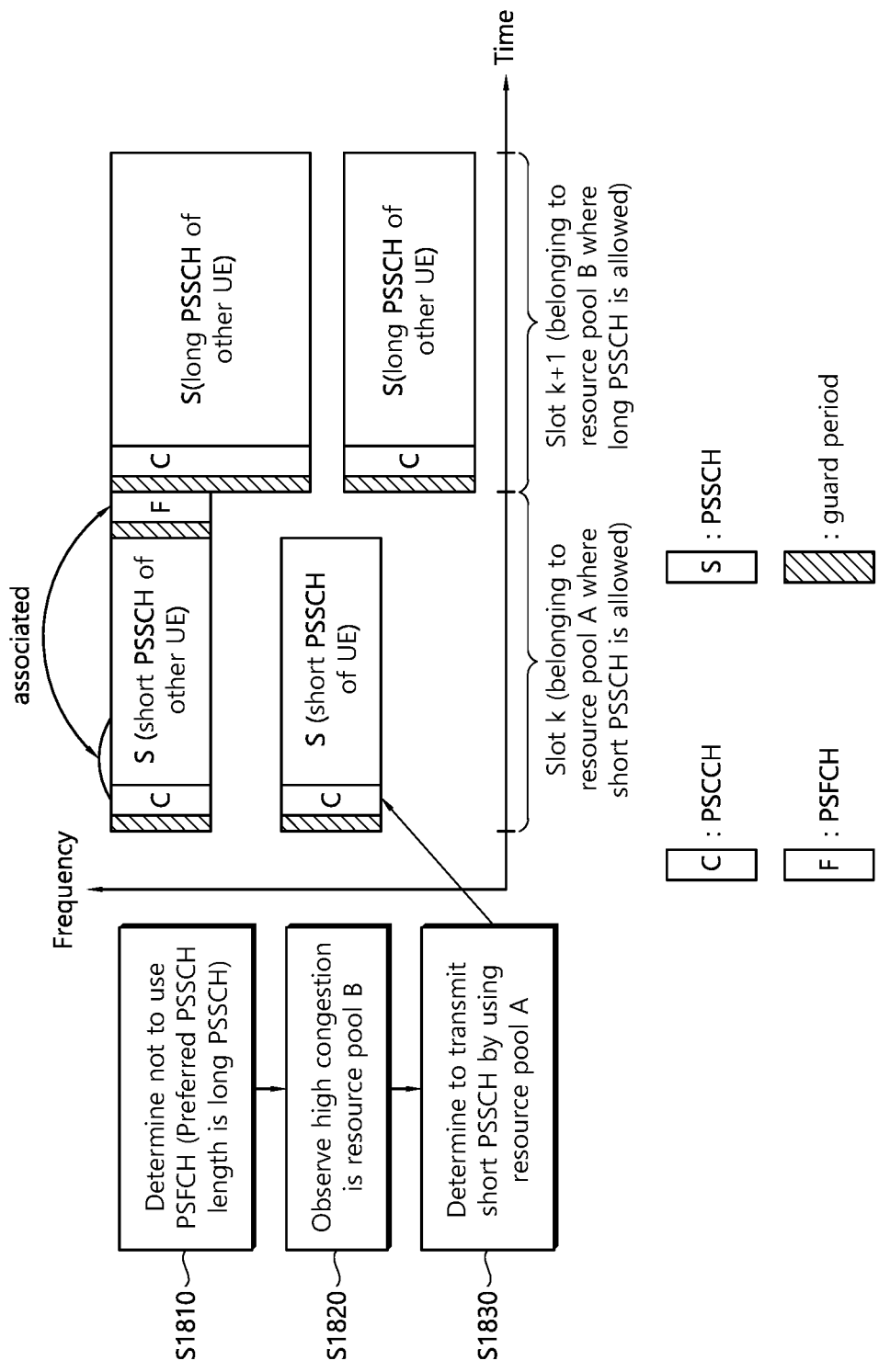
FIG. 18 illustrates operations of a case where the UE does not use PSFCH and where the preferred PSSCH length of the UE is long.
Figure 19:
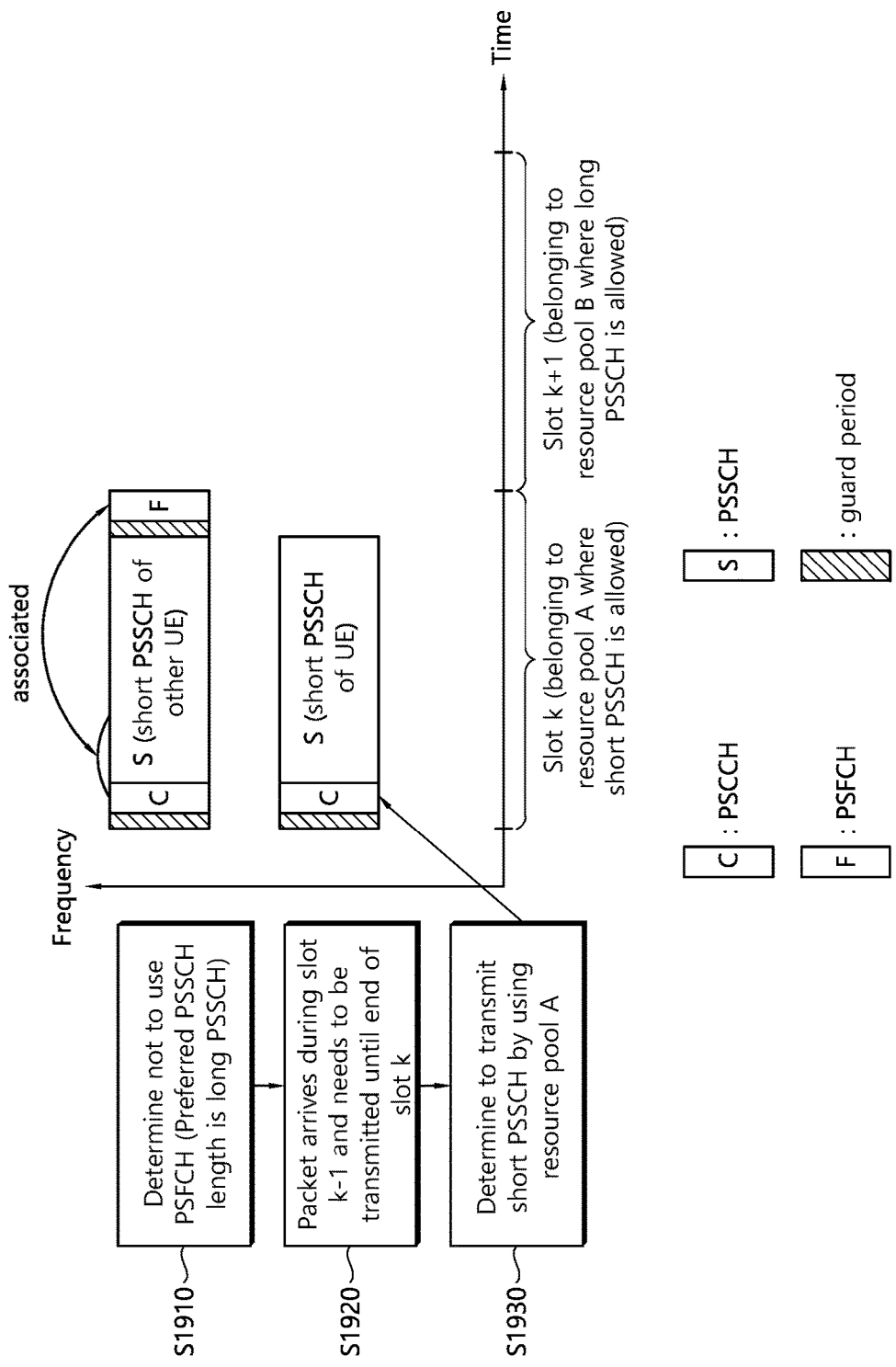
FIG. 19 illustrates operations of a case where the UE does not use PSFCH and where the preferred PSSCH length of the UE is long.

In other words, as described above, in order to prevent the receiving performance from being degraded due to additional AGC, and so on, which is followed by transmission of PSSCHs having different lengths, a method for configuring each of a resource pool where PSFCH allocation is allowed (e.g., a resource pool where short PSSCHs are allowed) and a resource pool where PSFCH allocation is not allowed (e.g., a resource pool where short PSSCHs are not allowed). Herein, as shown in FIG. 18 and FIG. 19, by separating each resource pool (e.g., a resource pool where long PSSCHs are allowed and a resource pool where short PSSCHs are allowed) on the time domain, the degradation in the receiving performance caused by the additional AGC may be more efficiently compensated. Therefore, the UE may perform PSSCH transmission/reception on a resource pool where preferred PSSCH length is allowed.

However, as described above, since a hard resource pool separation may cause resource fragmentation and inefficiency, the performance of PSSCH transmission/reception, by the UE, also on a resource pool where non-preferred PSSCH length is allowed needs to be exceptionally allowed.

FIG. 15 shows an example of multiple sidelink channels being allocated on a time/frequency resource.

Referring to FIG. 15, a guard period, PSCCH, PSSCH, and PSFCH may be allocated for a single slot. In this drawing, such allocation method may be referred to as a first allocation. Herein, the PSFCH of the first allocation may be a channel being associated to the PSCCH and/or PSSCH of the first allocation. In other words, the PSFCH of the first allocation may be a channel for feedback on the PSCCH and/or PSSCH of the first allocation.

Additionally, a guard period, PSCCH, and PSSCH may be allocated for a single slot. In this drawing, such allocation method may be referred to as a second allocation.

When it is assumed that lengths of the PSCCH and guard period of the first allocation on the time domain and lengths of the PSCCH and guard period of the second allocation on the time domain are the same, since the PSFCH is allocated within a single slot in the first allocation, but since the PSFCH is not allocated within a single slot in the second allocation, as the PSSCH length on the time domain, the PSSCH of the second allocation may be relatively longer than the PSSCH of the first allocation. In this aspect, the PSSCH of the first allocation may be referred to as a short PSSCH, and the PSSCH of the second allocation may be referred to as a long PSSCH. For the long PSSCH, the short PSSCH, or a relation between the long PSSCH and the short PSSCH, it may be expressed that an PSSCH end symbol position of the second allocation is relatively later than an PSSCH end symbol position of the first allocation.

FIG. 16 shows another example of multiple sidelink channels being allocated on a time/frequency resource.

Referring to FIG. 16, a guard period, PSCCH, and PSSCH may be allocated for a first slot, and a guard period and PSFCH may be allocated for a second slot. In this drawing, such allocation method may be referred to as allocation A. Herein, the PSFCH of allocation A may be a channel being associated to the PSCCH and/or PSSCH of allocation A. In other words, the PSFCH of allocation A may be a channel for feedback on the PSCCH and/or PSSCH of allocation A.

Additionally, a guard period, PSCCH, and PSSCH may be allocated for a second slot. In this drawing, such allocation method may be referred to as allocation B. Allocation B may be the same as the second allocation of FIG. 15.

Herein, the lengths of each configuration element of allocation A on the time domain may be the same as the first allocation of FIG. 15. In other words, a total sum of the lengths of the guard period, PSCCH, PSSCH, and PSFCH of allocation A on the time domain may be equal to or shorter than a time duration of one symbol.

Additionally, herein, the length of the PSSCH of allocation A on the time domain may be shorter than the length of the PSSCH of allocation B on the time domain. In this case, the PSSCH of allocation A may be referred to as a short PSSCH, and the PSSCH of allocation B may be referred to as a long PSSCH. As described above, for the long PSSCH, the short PSSCH, or a relation between the long PSSCH and the short PSSCH, it may be expressed that an PSSCH end symbol position of allocation B is relatively later than an PSSCH end symbol position of allocation A.

FIG. 15 and FIG. 16 illustrate a separation of the PSCCH and PSSCH in the time domain within the same slot and a PSCCH/PSSCH transmission that does not use PSFCH. And, in this case, it will be assumed that the PSCCH/PSSCH may use a potential PSFCH symbol. Additionally, although it is assumed in the aforementioned drawings that a guard period for performing switching between transmission and reception exists in front of each of the PSSCH and PSFCH, the guard period may be located at other positions. Herein, if a transmission is maintained until an end of one slot, the channel may be defined as a long PSSCH. And, if the transmission ends before a PSFCH symbol, the channel may be defined as a short PSSCH.

The PSSCH length that is used by each UE may be determined based on the usage (or utilization) of the PSFCH. If the UE transmits a PSSCH requesting HARQ feedback on an associated PSFCH, it will be preferable to use a short PSSCH. In this case, the preferred PSSCH length of the UE becomes a short length. If the UE transmits a PSSCH that does not request HARQ feedback, by transmitting a long PSSCH, a larger amount of resource may be available for usage. And, therefore, the preferred PSSCH length becomes a long length.

If a long PSCCH/PSSCH is multiplexed with a short PSCCH/PSSCH or PSFCH within the same slot, in light of the receiver of the long PSCCH/PSSCH, the overall reception power changes significantly in a potential PSFCH symbol. Therefore, in order to adapt to the changed power level, the receiver may need to perform the AGC operation once again, and, during the AGC period, a signal cannot be accurately received. This may cause a loss in OFDM symbols and may degrade the overall performance.

In order to prevent such inefficiency from occurring, multiple resource pools may be configured. Each resource pool may have an allowable PSSCH length or a parameter for equally determining a PSSCH end symbol position, and only the allowed PSSCH length may be transmitted from the resource pool. By using this solution, at least an additional AGC for long PPSCH transmissions is not needed. However, a hard resource pool separation may cause resource fragmentation and inefficiency.

The present disclosure proposes that each UE first determines a preferred PSSCH length, for example, based on the usage of a PSFCH. Determining the usage of PSFCH may be static and may also be based on service requirements, such as required latency, reliability, service-type (usage or non-usage of unicast, groupcast, and broadcast transmission), and so on. In a general situation, the UE may use a preferred PSSCH length during an actual PSSCH transmission, and the transmission occurs in a resource pool where the preferred PSSCH length is allowed.

However, in order to adequately handle part of the exceptional cases, if specific conditions are satisfied, the present disclosure proposes that each UE determines usage of the non-preferred PSSCH length and that actual transmission occurs in a resource pool where non-preferred PPSCH length is allowed. Detailed description on the exception conditions will hereinafter described in detail.

Figure 17:
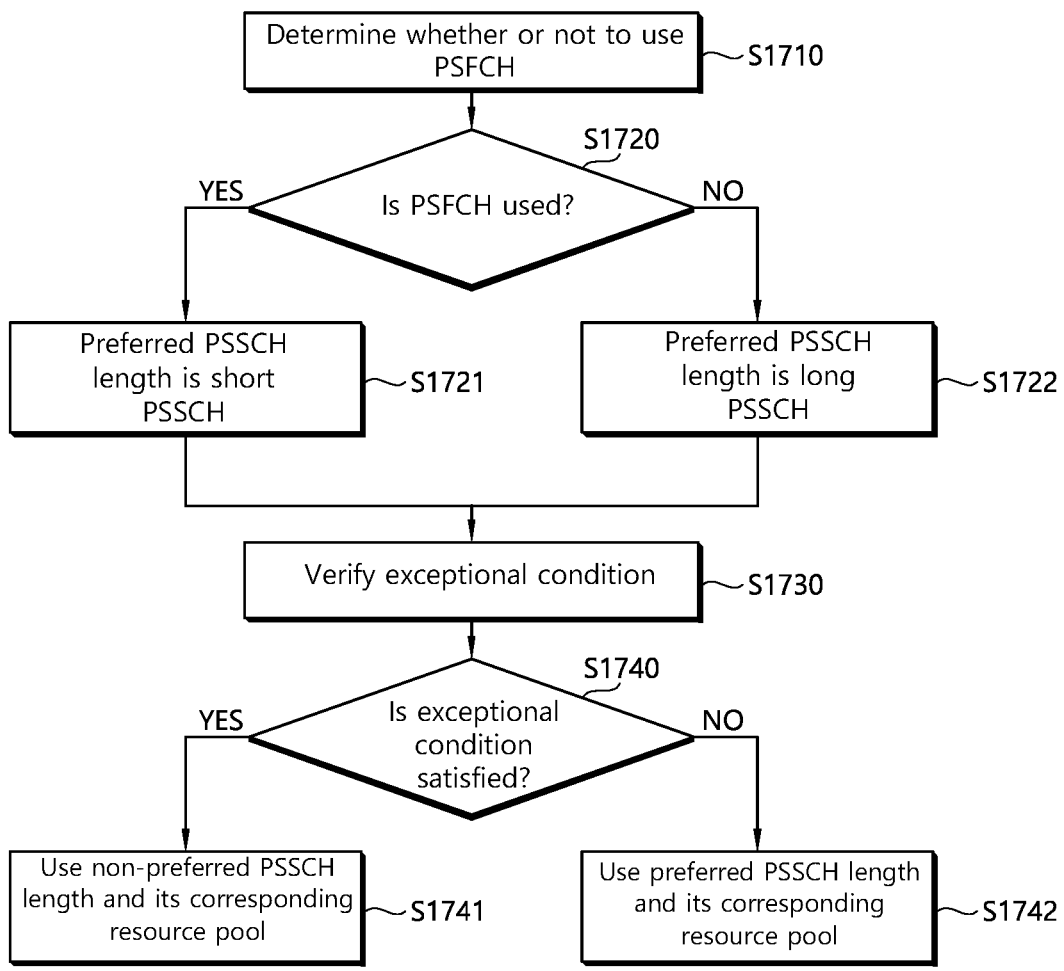
FIG. 17 shows an example of an overall procedure for determining PSSCH lengths and a resource pool that is to be used.

FIG. 17 shows an example of an overall procedure for determining PSSCH lengths and a resource pool that is to be used.

Referring to FIG. 17, the UE determines usage or non-usage of PSFCH (S1710 and S1720). The usage or non-usage of PSFCH may be determined based on a packet that is received by the UE. For example, the usage or non-usage of PSFCH may be determined based on a sidelink radio bearer having a packet generated therein or a QoS. Meanwhile, although FIG. 17 may separately illustrate step S1710 and step S1720, this is merely an example given to simplify the description of the procedure for determining a resource pool. And, therefore, the two steps may be performed as a single step.

If the UE determines to use the PSFCH, a preferred PSSCH length of the UE may be a short PSSCH (S1721). Alternatively, if the UE determines to not use the PSFCH, a preferred PSSCH length of the UE may be a long PSSCH (S1722).

If the preferred PSSCH length of the UE is determined, the UE verifies an exceptional condition (S1730). Herein, an exception condition refers to a condition for allowing the UE to use a non-preferred PSSCH length and not a preferred PSSCH length. This will be described in more detail later on.

Thereafter, the UE verifies whether or not the exceptional condition is satisfied (S1740). In case the exceptional condition is satisfied, the UE uses the non-preferred PSSCH length and its corresponding resource pool (S1741). Alternatively, in case the exceptional condition is not satisfied, the UE uses the preferred PSSCH length and its corresponding resource pool (S1742).

Meanwhile, in the present disclosure including FIG. 17, the preferred PSSCH length and its corresponding resource pool may be replaced with allowance or disallowance of PSFCH allocation and its corresponding resource pool. As a more detailed example, in case a short PSSCH is the preferred PSSCH length, a preferred resource pool may be a resource pool where PSFCH allocation is allowed. And, in case a long PSSCH is the preferred PSSCH length, a preferred resource pool may be a resource pool where PSFCH allocation is not allowed.

Hereinafter, the above-described exceptional condition will be described in more detail.

For example, if high congestion is observed in a resource pool where the preferred PSSCH length is allowed, such exception is allowed. If the UE observes a high congestion level in a resource pool where the preferred PSSCH length is allowed, the UE is allowed to use a non-preferred PSSCH length and its corresponding resource pool. Herein, an assessment on the high congestion may be performed by comparing the congestion level observation with a predetermined threshold value. For example, if a CBR measured in the resource pool is greater than the threshold value, the UE may assume that the level of congestion in the resource pool is high. Additionally, the threshold value may be configured to a maximum (or highest) CBR value possible (e.g., 100%), and such configuration means that the UE is not allowed to use a resource pool having a non-preferred PSSCH length. Conversely, the threshold value may be configured to a minimum (or lowest) CBR value possible (e.g., 0%), and such configuration means that the UE is always allowed to use a resource pool having a non-preferred PSSCH length. A CBR may be defined as a time/frequency resource ratio wherein a measured energy is greater than a given level. Instead, the assessment of high congestion may be based on a relative comparison between CBR values measured from two different resource pools. For example, if a CBR measured in resource pool A is higher than a CBR measured in resource pool B, the UE may assume that the congestion level is high in resource pool A. In order to prevent the UE from excessively using the non-preferred PSSCH length, when comparing the CBR measurement of the resource pool having the non-preferred PSSCH length with the CBR measurement of the resource pool having the preferred PSSCH length, an offset value may be added to the CBR measurement of the resource pool having the non-preferred PSSCH length. The offset value may be configured to a maximum (or highest) CBR value possible (e.g., 100%), and such configuration means that the UE is not allowed to use a resource pool having a non-preferred PSSCH length.

FIG. 18 illustrates operations of a case where the UE does not use PSFCH and where the preferred PSSCH length of the UE is long.

In FIG. 18, a resource pool where a short PSSCH is allowed may be referred to as resource pool A, and a resource pool where a long PSSCH is allowed may be referred to as resource pool B. Herein, resource pool A may be a resource pool where PSFCH allocation is allowed, and resource pool B may be a resource pool where PSFCH allocation is not allowed. Also, herein, slot k may be a slot belonging to resource pool A, and slot k+1 may be a slot belonging to resource pool B.

Referring to FIG. 18, the UE may determine not to use the PSFCH (S1810). For example, a packet that is received by the UE may be packet that does not request feedback. In this case, the preferred PSSCH length of the UE may be long. In the same meaning, a preferred resource pool of the UE may be a resource pool where PSFCH allocation is not allowed.

In this case, the UE may measure the congestion level for resource pool B. This may correspond to the step wherein the UE verifies an exceptional condition, which is step S1730 of FIG. 17. Herein, for example, the UE may observe a high congestion in resource pool B (S1820). In this case, the UE may determine to use a short PSSCH by using resource pool A (S1830).

Therefore, the UE may transmit a packet received by the UE by using a short PSSCH on slot k. In this case, the UE may not perform transmission and/or reception operations for a potential PSFCH allocation resource.

As another example, in case latency requirements are not satisfied in a resource pool where the preferred PSSCH length is allowed, such exception is allowed. For example, when a packet arrives at a UE, and if there is no resource available for usage within the resource pool for the preferred PSSCH length before a packet transmission deadline, the UE may use the non-preferred PSSCH length in order to transmit the arrived packet within the required time.

FIG. 19 illustrates operations of a case where the UE does not use PSFCH and where the preferred PSSCH length of the UE is long.

In FIG. 19, a resource pool where a short PSSCH is allowed may be referred to as resource pool A, and a resource pool where a long PSSCH is allowed may be referred to as resource pool B. Herein, slot k may be a slot belonging to resource pool A, and slot k+1 may be a slot belonging to resource pool B.

Referring to FIG. 19, the UE may determine not to use the PSFCH (S1910). For example, a packet that is received by the UE may be packet that does not request feedback. In this case, the preferred PSSCH length of the UE may be long.

Herein, a packet that is received by the UE may be a packet that is transmitted to the UE within slot k−1 and that needs to be transmitted until the end of slot k (S1920). Herein, the order of performance of step S1910 and step S1920 may be interchanged.

According to FIG. 19, since slot k is a slot belonging to resource pool A and slot k+1 is a slot belonging to resource pool B, the UE may determine to transmit a short PSSCH by using resource pool A, which is a resource pool corresponding to slot k (S1930).

In order to ensure differentiation of quality of service (QoS), additional restriction may be applied to the determination (or decision) to allow the above-described exception. For example, the above-described exception may be allowed for a packet having a higher priority than a threshold value. And, herein, the packet priority may be a ProSe Per-Packet Priority (PPPP). More specifically, as the PPPP value of a packet becomes smaller, this means that the priority of the packet is high. Therefore, when the threshold value of PPPP is equal to k, the above-described exception may be allowed only for a packet having a PPPP value that is smaller than k. As another example, the above-described exception may be allowed only for a packet requiring a higher reliability level than a threshold value. And, as yet another example, the above-described exception may be allowed only for a packet requiring a greater communication range (distance) than a threshold value. Although the preferred PSSCH length of the UE is short, in case a long PSSCH is used due to the above-described exception, the UE may not be capable of using the PSFCH. In this case, part of the functions (e.g., HARQ feedback) may be temporarily turned off. In order to compensate for any reliability loss that may be caused by turning off the PSFCH-based functions, the UE may control some the other parameters (e.g., decrease modulation and coding scheme levels or increase number of re-transmissions, and so on).

As yet another example, an exceptional condition that prohibits the usage of a non-preferred resource pool may be considered. That is, if the exceptional condition is satisfied, the usage of the non-preferred resource pool may be prohibited. And, if the exceptional condition is not satisfied, the usage of the non-preferred resource pool may be allowed. Conversely, an exceptional condition that allows the usage of a non-preferred resource pool may also be considered. That is, if the exceptional condition is satisfied, the usage of the non-preferred resource pool may be allowed. And, if the exceptional condition is not satisfied, the usage of the non-preferred resource pool may (or may not) be allowed. Meanwhile, various methods may be applied to such exceptional conditions.

In other words, although FIG. 18 and FIG. 19 illustrates only an example of a case where the UE does not need to receive feedback information corresponding to or being related to the transmitted PSSCH, PSSCH transmission that is based on the non-preferred PSSCH length can also be performed even in a case where the feedback information needs to be received.

For example, the packet that is received by the UE may be a packet that requests feedback information. Accordingly, the preferred PPSCH length of the UE may be a short PSSCH. Herein, since the exceptional condition is satisfied, the UE may use a long PSSCH being the non-preferred PSSCH length and its corresponding resource pool. In this case, the UE may transmit the packet and may not receive any feedback information on the transmission.

Figure 20:
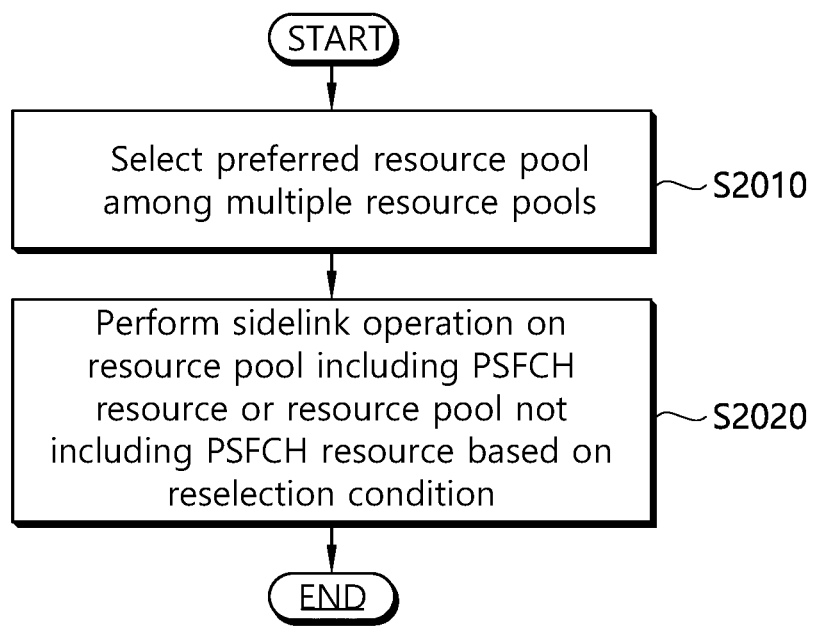
FIG. 20 is a flowchart for an exemplary method of performing a sidelink operation, by the UE, according to part of the embodiment of the present disclosure.

FIG. 20 is a flowchart for an exemplary method of performing a sidelink operation, by the UE, according to part of the embodiment of the present disclosure.

According to FIG. 20, the UE selects a preferred resource pool among multiple resource pools (S2010). Herein, the multiple resource pools may include a resource pool including PSFCH resource and a resource pool not including PSFCH resource.

Thereafter, the UE performs a sidelink operation on the resource pool including PSFCH resource or the resource pool not including PSFCH resource based on a reselection condition (S2020). Herein, the sidelink information may be PSSCH transmission.

As a detailed example related to FIG. 20, the preferred resource pool of the UE may be a resource pool including PSFCH resource. In this case, the preferred PSSCH length of the UE may be a short PSSCH. Herein, if the exceptional condition is satisfied, the UE performs a sidelink operation on a resource pool not including the PSFCH resource. And, if the exceptional condition is not satisfied, the UE performs a sidelink operation on a resource pool including the PSFCH resource. Additionally, herein, various configurations, such as CBR measurement, latency requirements (or conditions), and so on, which are described in the present disclosure, may be applied as exceptional condition. Furthermore, since various configurations, which are described in the present disclosure, may be applied for the example of FIG. 20, overlapping description shall be omitted for simplicity.

Meanwhile, various exceptional conditions of the present disclosure may be separately and differently configured for each resource pool or preferred PSSCH length. And, accordingly, each exceptional condition may have an asymmetrical satisfaction reference standard. In other words, the satisfaction reference standard for each of a case where the preferred PSS CH length is a short PSSCH and a case where the preferred PSSCH length is a long PSSCH may be different from one another. Alternatively, the satisfaction reference standard for each of a case where the preferred resource pool is a resource pool including PSFCH resource and a case where the preferred resource pool is a resource pool not including PSFCH resource may be different from one another.

For example, in case the preferred PSSCH length is a short PSSCH, i.e., in case of transmitting a packet requesting feedback information, a condition of performing PSSCH transmission, by the UE, by using the preferred PSSCH length may be absent (or may not exist) or may not always be satisfied. In other words, in case the UE has determined a short PSSCH as the preferred PSSCH length, or in case the UE has determined to use the PSFCH, the UE may not be capable of performing PSSCH transmission by using a resource pool other than the resource pool where a long PSSCH is allowed. That is, in case the UE has determined to use the PSFCH, the UE may transmit a PSSCH that only corresponds to a resource pool where the usage of PSFCH is possible. Conversely, in case the UE has determined to use the PSFCH, such restrictions may not exist.

As a more detailed example, when the satisfaction reference standard of an exceptional condition relates to the CBR being greater than a threshold value, and in case the UE has determined the short PSSCH as the preferred PSSCH length, the threshold value may be CBR=100%. However, in case the UE has determined the long PSSCH as the preferred PSSCH length, the threshold value may not be equal to 100%. Therefore, in this case, if the UE has determined the short PSSCH as the preferred PSSCH length, the UE shall always have to transmit the PSSCH on a resource pool where the short PSSCH is allowed. However, if the UE has determined the long PSSCH as the preferred PSSCH length, and in case the exceptional condition is satisfied, the UE may transmit the PSSCH on a resource pool where the short PSSCH is allowed. More specifically, in case the UE has determined the long PSSCH as the preferred PSSCH length, the threshold value may be equal to 0%. And, in this case, the UE is always allowed to transmit the PSSCH on a resource pool where the short PSSCH is allowed.

Figure 21:
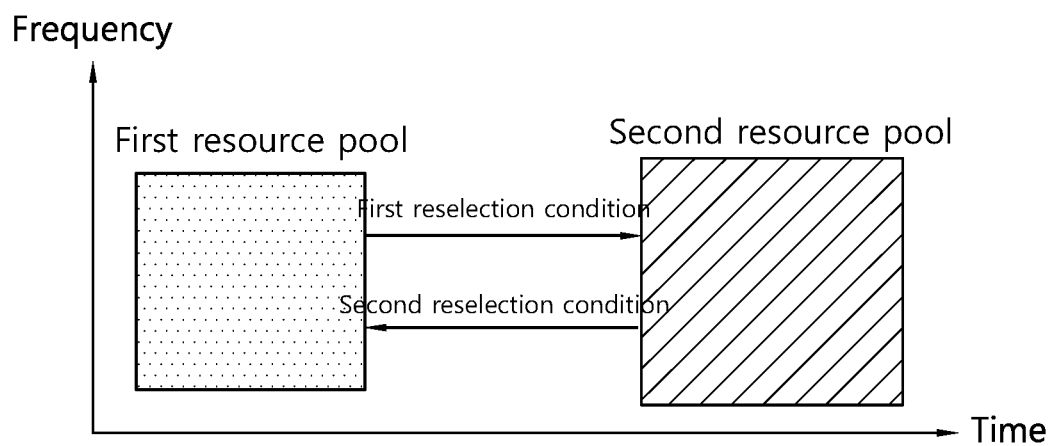
FIG. 21 illustrates a general view of an exemplary method of performing a sidelink operation, by the UE, according to part of the embodiment of the present disclosure.

FIG. 21 illustrates a general view of an exemplary method of performing a sidelink operation, by the UE, according to part of the embodiment of the present disclosure.

According to FIG. 21, each of a first resource pool and a second resource pool is configured in time-frequency resources. Herein, the first resource pool may be a resource pool including PSFCH resource or a resource pool where PSFCH allocation is allowed. Additionally, herein, the second resource pool may be a resource pool not including PSFCH resource or a resource pool where PSFCH allocation is not allowed.

After the UE has selected a preferred resource pool, the UE determines whether or not a reselection condition or exceptional condition is being satisfied. Herein, the reselection condition or exceptional condition may be satisfied if the CBR for the preferred resource pool is greater than the threshold value. The reselection condition or the exceptional condition may be the same or different from one another according to the preferred resource pool type (e.g., according to whether the preferred resource pool is the first resource pool or the second resource pool).

Referring to FIG. 21, when the preferred resource pool is the first resource pool, the reselection condition may be a first reselection condition. And, when the preferred resource pool is the second resource pool, the reselection condition may be a second reselection condition. For example, the first reselection condition may be satisfied when a CBR for the first resource pool is greater than a first threshold value. And, the second reselection condition may be satisfied when a CBR for the second resource pool is greater than a second threshold value. Herein, for example, the first threshold value may be equal to 100%, and the second threshold value may be equal to 50%. Alternatively, the first threshold value and the second threshold value may be the same (or equal to one another).

As shown in FIG. 21, by adequately configuring the first reselection condition and/or the second reselection condition, the sidelink operation of the UE may be performed more efficiently. Furthermore, since various technical features that are proposed in the present disclosure may be applied to FIG. 21, overlapping description shall be omitted for simplicity.

According to the present disclosure, since PSSCHs having different lengths or different end symbol positions are separated from a resource pool region, the system may avoid inefficiency that may occur due to multiplexing of different PSSCH lengths. Additionally, by allowing an exception of using non-preferred PSSCH lengths, resource fragmentation may be prevented.

The claims specified in the present specification may be combined by various methods. For example, technical features of the method claim(s) of the present specification may be combined so as to be implemented as a device (or apparatus), and technical features of the device claim(s) may be combined so as to be implemented as a method. Additionally, technical features of the method claim(s) of the present specification and technical features of the device claim(s) may be combined so as to be implemented as a device (or apparatus), and technical features of the method claim(s) of the present specification and technical features of the device claim(s) may be combined so as to be implemented as a method.

Hereinafter, an example of a communication system to which the present disclosure is applied will be described in detail.

Although the present disclosure will not be limited only to this, various descriptions, functions, procedures, proposals, methods, and/or operation flowcharts of the present disclosure may be applied to various fields requiring wireless communication/connection (e.g., between devices.

Hereinafter, examples of the same will be escribed in more detail with reference to the appended drawings. Unless described and specified otherwise, same reference numerals in the following drawings/description shall be used to describe examples of the same or corresponding hardware blocks, software blocks, or function blocks.

Figure 22:
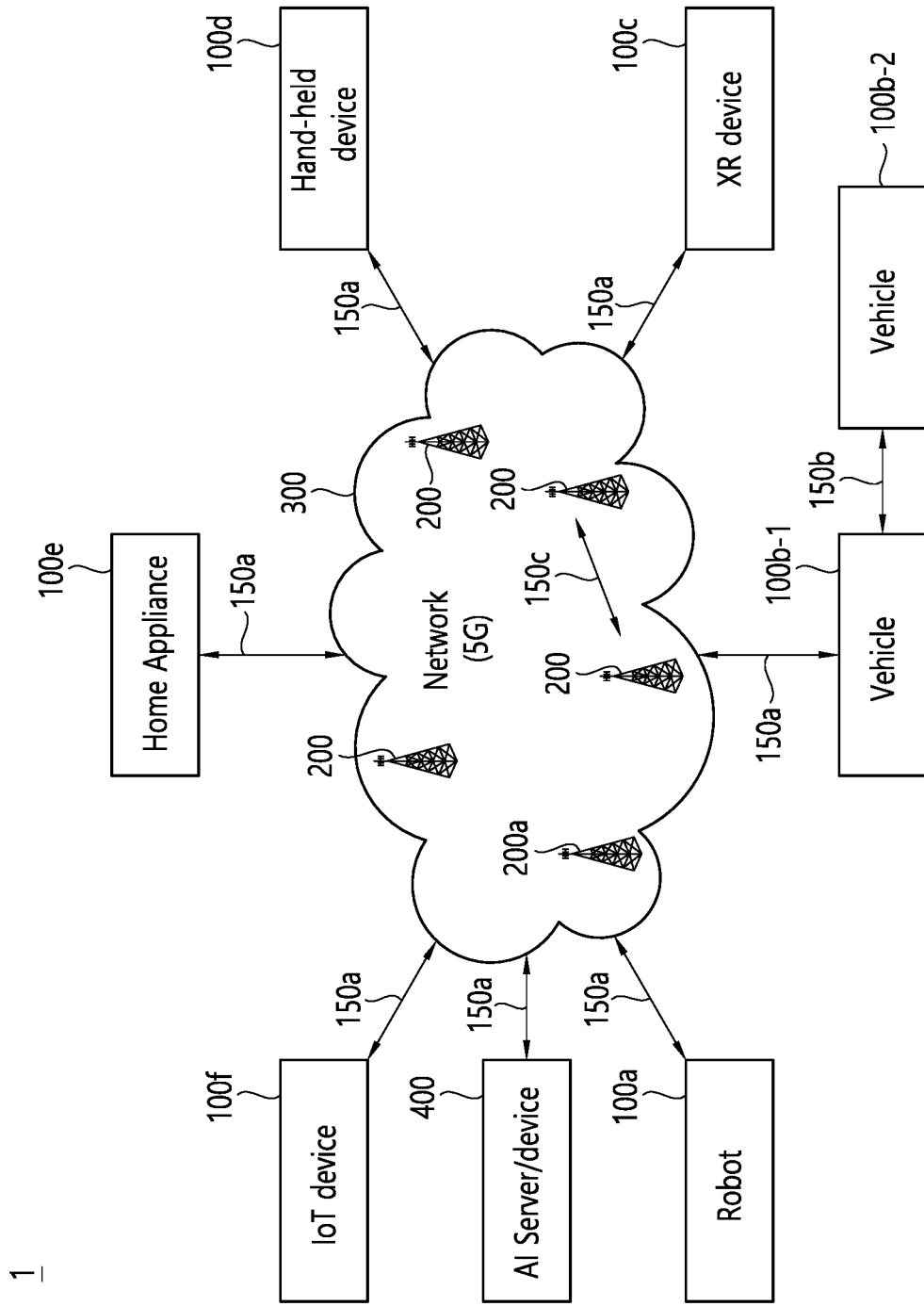
FIG. 22 illustrates a communication system 1 applied to the disclosure.

FIG. 22 illustrates a communication system 1 applied to the disclosure.

Referring to FIG. 22, the communication system 1 applied to the disclosure includes a wireless device, a base station, and a network. Here, the wireless device refers to a device that performs communication using a radio access technology (e.g., 5G new RAT (NR) or Long-Term Evolution (LTE)) and may be referred to as a communication/wireless/5G device. The wireless device may include, but limited to, a robot 100a, a vehicle 100b-1 and 100b-2, an extended reality (XR) device 100c, a hand-held device 100d, a home appliance 100e, an Internet of things (IoT) device 100f, and an AI device/server 400. For example, the vehicle may include a vehicle having a wireless communication function, an autonomous driving vehicle, a vehicle capable of inter-vehicle communication, or the like. Here, the vehicle may include an unmanned aerial vehicle (UAV) (e.g., a drone). The XR device may include augmented reality (AR)/virtual reality (VR)/mixed reality (MR) devices and may be configured as a head-mounted device (HMD), a vehicular head-up display (HUD), a television, a smartphone, a computer, a wearable device, a home appliance, digital signage, a vehicle, a robot, or the like. The hand-held device may include a smartphone, a smartpad, a wearable device (e.g., a smart watch or smart glasses), and a computer (e.g., a notebook). The home appliance may include a TV, a refrigerator, a washing machine, and the like. The IoT device may include a sensor, a smart meter, and the like. The base station and the network may be configured, for example, as wireless devices, and a specific wireless device 200a may operate as a base station/network node for other wireless devices.

The wireless devices 100a to 100f may be connected to the network 300 through the base station 200. Artificial intelligence (AI) technology may be applied to the wireless devices 100a to 100f, and the wireless devices 100a to 100f may be connected to an AI server 400 through the network 300. The network 300 may be configured using a 3G network, a 4G (e.g., LIE) network, or a 5G (e.g., NR) network. The wireless devices 100a to 100f may communicate with each other via the base station 200/network 300 and may also perform direct communication (e.g. sidelink communication) with each other without passing through the base station/network. For example, the vehicles 100b-1 and 100b-2 may perform direct communication (e.g. vehicle-to-vehicle (V2V)/vehicle-to-everything (V2X) communication). Further, the IoT device (e.g., a sensor) may directly communicate with another IoT device (e.g., a sensor) or another wireless device 100a to 100f.

Wireless communications/connections 150a, 150b, and 150c may be established between the wireless devices 100a to 100f and the base station 200 and between the base stations 200. Here, the wireless communications/connections may be established by various wireless access technologies (e.g., NR), such as uplink/downlink communication 150a, sidelink communication 150b (or D2D communication), and inter-base station communication 150c (e.g., relay or integrated access backhaul (IAB)). The wireless devices and the base station/wireless devices, and the base stations may transmit/receive radio signals to/from each other through the wireless communications/connections 150a, 150b, and 150c. For example, the wireless communications/connections 150a, 150b, and 150c may transmit/receive signals over various physical channels. To this end, at least some of various configuration information setting processes, various signal processing processes (e.g., channel encoding/decoding, modulation/demodulation, resource mapping/demapping, and the like), and resource allocation processes may be performed on the basis of various proposals of the disclosure.

Figure 23:
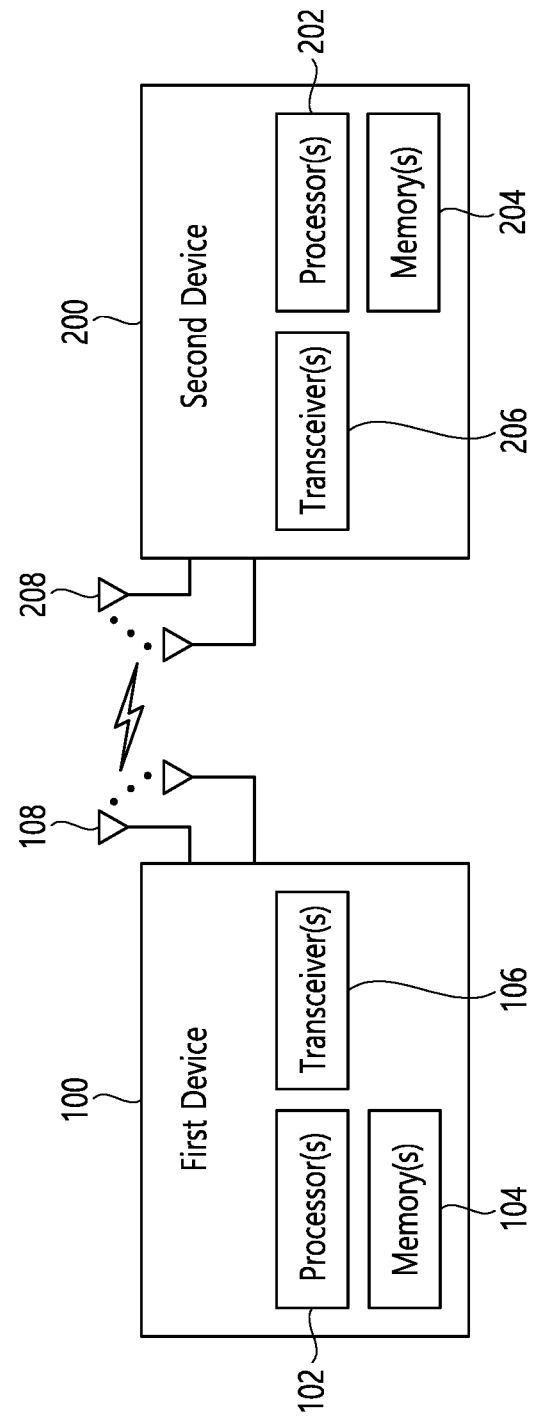
FIG. 23 illustrates a wireless device that is applicable to the disclosure.

FIG. 23 illustrates a wireless device that is applicable to the disclosure.

Referring to FIG. 23, a first wireless device 100 and a second wireless device 200 may transmit and receive radio signals through various radio access technologies (e.g., LIE and NR). Here, the first wireless device 100 and the second wireless device 200 may respectively correspond to a wireless device 100x and the base station 200 of FIG. 22 and/or may respectively correspond to a wireless device 100x and a wireless device 100x of FIG. 22.

The first wireless device 100 includes at least one processor 102 and at least one memory 104 and may further include at least one transceiver 106 and/or at least one antenna 108. The processor 102 may be configured to control the memory 104 and/or the transceiver 106 and to implement the descriptions, functions, procedures, proposals, methods, and/or operational flowcharts disclosed herein. For example, the processor 102 may process information in the memory 104 to generate first information/signal and may then transmit a radio signal including the first information/signal through the transceiver 106. In addition, the processor 102 may receive a radio signal including second information/signal through the transceiver 106 and may store information obtained from signal processing of the second information/signal in the memory 104. The memory 104 may be connected to the processor 102 and may store various pieces of information related to the operation of the processor 102. For example, the memory 104 may store a software code including instructions to perform some or all of processes controlled by the processor 102 or to perform the descriptions, functions, procedures, proposals, methods, and/or operational flowcharts disclosed herein. Here, the processor 102 and the memory 104 may be part of a communication modem/circuit/chip designed to implement a radio communication technology (e.g., LTE or NR). The transceiver 106 may be connected with the processor 102 and may transmit and/or receive a radio signal via the at least one antennas 108. The transceiver 106 may include a transmitter and/or a receiver. The transceiver 106 may be replaced with a radio frequency (RF) unit. In the disclosure, the wireless device may refer to a communication modem/circuit/chip.

The second wireless device 200 includes at least one processor 202 and at least one memory 204 and may further include at least one transceiver 206 and/or at least one antenna 208. The processor 202 may be configured to control the memory 204 and/or the transceiver 206 and to implement the descriptions, functions, procedures, proposals, methods, and/or operational flowcharts disclosed herein. For example, the processor 202 may process information in the memory 204 to generate third information/signal and may then transmit a radio signal including the third information/signal through the transceiver 206. In addition, the processor 202 may receive a radio signal including fourth information/signal through the transceiver 206 and may store information obtained from signal processing of the fourth information/signal in the memory 204. The memory 204 may be connected to the processor 202 and may store various pieces of information related to the operation of the processor 202. For example, the memory 204 may store a software code including instructions to perform some or all of processes controlled by the processor 202 or to perform the descriptions, functions, procedures, proposals, methods, and/or operational flowcharts disclosed herein. Here, the processor 202 and the memory 204 may be part of a communication modem/circuit/chip designed to implement a radio communication technology (e.g., LTE or NR). The transceiver 206 may be connected with the processor 202 and may transmit and/or receive a radio signal via the at least one antennas 208. The transceiver 206 may include a transmitter and/or a receiver. The transceiver 206 may be replaced with an RF unit. In the disclosure, the wireless device may refer to a communication modem/circuit/chip.

Hereinafter, hardware elements of the wireless devices 100 and 200 are described in detail. At least one protocol layer may be implemented, but limited to, by the at least one processor 102 and 202. For example, the at least one processor 102 and 202 may implement at least one layer (e.g., a functional layer, such as PHY, MAC, RLC, PDCP, RRC, and SDAP layers). The at least one processor 102 and 202 may generate at least one protocol data unit (PDU) and/or at least one service data unit (SDU) according to the descriptions, functions, procedures, proposals, methods, and/or operational flowcharts disclosed herein. The at least one processor 102 and 202 may generate a message, control information, data, or information according to the descriptions, functions, procedures, proposals, methods, and/or operational flowcharts disclosed herein. The at least one processor 102 and 202 may generate a signal (e.g., a baseband signal) including a PDU, an SDU, a message, control information, data, or information according to the functions, procedures, proposals, and/or methods disclosed herein and may provide the signal to the at least one transceiver 106 and 206. The at least one processor 102 and 202 may receive a signal (e.g., a baseband signal) from the at least one transceiver 106 and 206 and may obtain a PDU, an SDU, a message, control information, data, or information according to the descriptions, functions, procedures, proposals, methods, and/or operational flowcharts disclosed herein.

The at least one processor 102 and 202 may be referred to as a controller, a microcontroller, a microprocessor, or a microcomputer. The at least one processor 102 and 202 may be implemented by hardware, firmware, software, or a combination thereof. For example, at least one application-specific integrated circuit (ASIC), at least one digital signal processor (DSP), at least one digital signal processing devices (DSPD), at least one programmable logic devices (PLD), or at least one field programmable gate array (FPGA) may be included in the at least one processor 102 and 202. The descriptions, functions, procedures, proposals, methods, and/or operational flowcharts disclosed herein may be implemented using firmware or software, and the firmware or software may be configured to include modules, procedures, functions, and the like. The firmware or software configured to perform the descriptions, functions, procedures, proposals, methods, and/or operational flowcharts disclosed herein may be included in the at least one processor 102 and 202 or may be stored in the at least one memory 104 and 204 and may be executed by the at least one processor 102 and 202. The descriptions, functions, procedures, proposals, methods, and/or operational flowcharts disclosed herein may be implemented in the form of a code, an instruction, and/or a set of instructions using firmware or software.

The at least one memory 104 and 204 may be connected to the at least one processor 102 and 202 and may store various forms of data, signals, messages, information, programs, codes, indications, and/or commands. The at least one memory 104 and 204 may be configured as a ROM, a RAM, an EPROM, a flash memory, a hard drive, a register, a cache memory, a computer-readable storage medium, and/or a combinations thereof. The at least one memory 104 and 204 may be disposed inside and/or outside the at least one processor 102 and 202. In addition, the at least one memory 104 and 204 may be connected to the at least one processor 102 and 202 through various techniques, such as a wired or wireless connection.

The at least one transceiver 106 and 206 may transmit user data, control information, a radio signal/channel, or the like mentioned in the methods and/or operational flowcharts disclosed herein to at least different device. The at least one transceiver 106 and 206 may receive user data, control information, a radio signal/channel, or the like mentioned in the descriptions, functions, procedures, proposals, methods, and/or operational flowcharts disclosed herein from at least one different device. For example, the at least one transceiver 106 and 206 may be connected to the at least one processor 102 and 202 and may transmit and receive a radio signal. For example, the at least one processor 102 and 202 may control the at least one transceiver 106 and 206 to transmit user data, control information, or a radio signal to at least one different device. In addition, the at least one processor 102 and 202 may control the at least one transceiver 106 and 206 to receive user data, control information, or a radio signal from at least one different device. The at least one transceiver 106 and 206 may be connected to the at least one antenna 108 and 208 and may be configured to transmit or receive user data, control information, a radio signal/channel, or the like mentioned in the descriptions, functions, procedures, proposals, methods, and/or operational flowcharts disclosed herein through the at least one antenna 108 and 208. In this document, the at least one antenna may be a plurality of physical antennas or may be a plurality of logical antennas (e.g., antenna ports). The at least one transceiver 106 and 206 may convert a received radio signal/channel from an RF band signal into a baseband signal in order to process received user data, control information, a radio signal/channel, or the like using the at least one processor 102 and 202. The at least one transceiver 106 and 206 may convert user data, control information, a radio signal/channel, or the like, processed using the at least one processor 102 and 202, from a baseband signal to an RF bad signal. To this end, the at least one transceiver 106 and 206 may include an (analog) oscillator and/or a filter.

Figure 24:
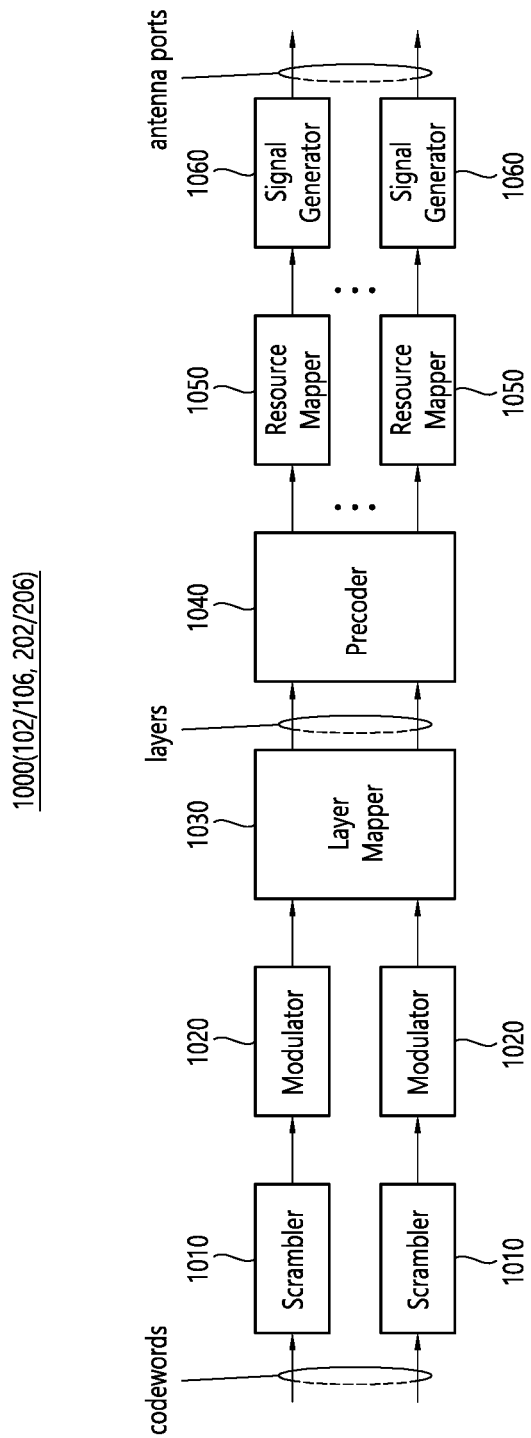
FIG. 24 illustrates a signal processing circuit for a transmission signal.

FIG. 24 illustrates a signal processing circuit for a transmission signal.

Referring to FIG. 24, the signal processing circuit 1000 may include a scrambler 1010, a modulator 1020, a layer mapper 1030, a precoder 1040, a resource mapper 1050, and a signal generator 1060. Operations/functions illustrated with reference to FIG. 24 may be performed, but not limited to, in the processor 102 and 202 and/or the transceiver 106 and 206 of FIG. 23. Hardware elements illustrated in FIG. 24 may be configured in the processor 102 and 202 and/or the transceiver 106 and 206 of FIG. 23. For example, blocks 1010 to 1060 may be configured in the processor 102 and 202 of FIG. 23. Alternatively, blocks 1010 to 1050 may be configured in the processor 102 and 202 of FIG. 23, and a block 1060 may be configured in the transceiver 106 and 206 of FIG. 23.

A codeword may be converted into a radio signal via the signal processing circuit 1000 of FIG. 24. Here, the codeword is an encoded bit sequence of an information block. The information block may include a transport block (e.g., a UL-SCH transport block and a DL-SCH transport block). The radio signal may be transmitted through various physical channels (e.g., a PUSCH or a PDSCH).

Specifically, the codeword may be converted into a scrambled bit sequence by the scrambler 1010. A scrambled sequence used for scrambling is generated on the basis of an initialization value, and the initialization value may include ID information about a wireless device. The scrambled bit sequence may be modulated into a modulation symbol sequence by the modulator 1020. A modulation scheme may include pi/2-binary phase shift keying (pi/2-BPSK), m-phase shift keying (m-PSK), m-quadrature amplitude modulation (m-QAM), and the like. A complex modulation symbol sequence may be mapped to at least one transport layer by the layer mapper 1030. Modulation symbols of each transport layer may be mapped to a corresponding antenna port(s) by the precoder 1040 (precoding). Output z from the precoder 1040 may be obtained by multiplying output y from the layer mapper 1030 by a precoding matrix W of N*M, where N is the number of antenna ports, and M is the number of transport layers. Here, the precoder 1040 may perform precoding after performing transform precoding (e.g., DFT transform) on complex modulation symbols. Alternatively, the precoder 1040 may perform precoding without performing transform precoding.

The resource mapper 1050 may map a modulation symbol of each antenna port to a time-frequency resource. The time-frequency resource may include a plurality of symbols (e.g., CP-OFDMA symbols or DFT-s-OFDMA symbols) in the time domain and may include a plurality of subcarriers in the frequency domain. The signal generator 1060 may generate a radio signal from mapped modulation symbols, and the generated radio signal may be transmitted to another device through each antenna. To this end, the signal generator 1060 may include an inverse fast Fourier transform (IFFT) module, a cyclic prefix (CP) inserter, a digital-to-analog converter (DAC), a frequency upconverter, and the like.

A signal processing procedure for a received signal in a wireless device may be performed in the reverse order of the signal processing procedure 1010 to 1060 of FIG. 24. For example, a wireless device (e.g., 100 and 200 of FIG. 23) may receive a radio signal from the outside through an antenna port/transceiver. The received radio signal may be converted into a baseband signal through a signal reconstructor. To this end, the signal reconstructor may include a frequency downconverter, an analog-to-digital converter (ADC), a CP remover, and a fast Fourier transform (FFT) module. The baseband signal may be reconstructed to a codeword through resource demapping, postcoding, demodulation, and descrambling. The codeword may be reconstructed to an original information block through decoding. Thus, a signal processing circuit (not shown) for a received signal may include a signal reconstructor, a resource demapper, a postcoder, a demodulator, a descrambler and a decoder.

Figure 25:
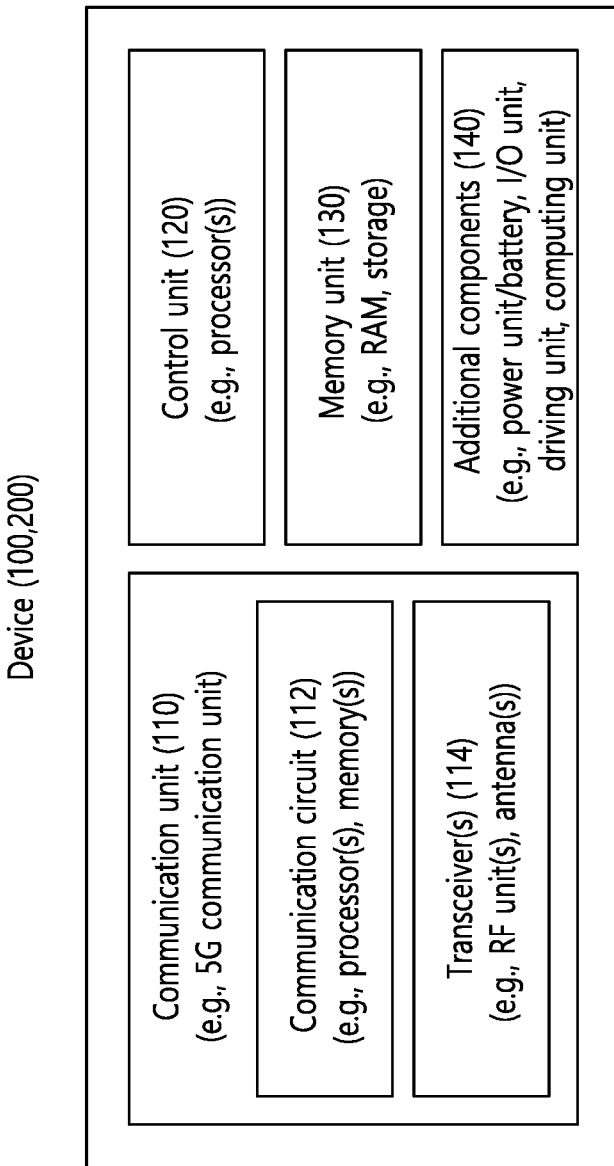
FIG. 25 illustrates another example of a wireless device applied to the disclosure.

FIG. 25 illustrates another example of a wireless device applied to the disclosure. The wireless device may be configured in various forms depending on usage/service.

Referring to FIG. 25, the wireless devices 100 and 200 may correspond to the wireless device 100 and 200 of FIG. 23 and may include various elements, components, units, and/or modules. For example, the wireless device 100 and 200 may include a communication unit 110, a control unit 120, a memory unit 130, and additional components 140. The communication unit may include a communication circuit 112 and a transceiver(s) 114. For example, the communication circuit 112 may include the at least one processor 102 and 202 and/or the at least one memory 104 and 204 of FIG. 23. For example, the transceiver(s) 114 may include the at least one transceiver 106 and 206 and/or the at least one antenna 108 and 208 of FIG. 23. The control unit 120 is electrically connected to the communication unit 110, the memory unit 130, and the additional components 140 and controls overall operations of the wireless device. For example, the control unit 120 may control electrical/mechanical operations of the wireless device on the basis of a program/code/command/information stored in the memory unit 130. In addition, the control unit 120 may transmit information stored in the memory unit 130 to the outside (e.g., a different communication device) through a wireless/wired interface via the communication unit 110 or may store, in the memory unit 130, information received from the outside (e.g., a different communication device) through the wireless/wired interface via the communication unit 110.

The additional components 140 may be configured variously depending on the type of the wireless device. For example, the additional components 140 may include at least one of a power unit/battery, an input/output (I/O) unit, a driving unit, and a computing unit. The wireless device may be configured, but not limited to, as a robot (100a in FIG. 22), a vehicle (100 b-1 or 100 b-2 in FIG. 22), an XR device (100 c in FIG. 22), a hand-held device (100 d in FIG. 22), a home appliance (100e in FIG. 22), an IoT device (100f in FIG. 22), a terminal for digital broadcasting, a hologram device, a public safety device, an MTC device, a medical device, a fintech device (or financial device), a security device, a climate/environmental device, an AI server/device (400 in FIG. 22), a base station (200 in FIG. 22), a network node, or the like. The wireless device may be mobile or may be used in a fixed place depending on usage/service.

In FIG. 25, all of the various elements, components, units, and/or modules in the wireless devices 100 and 200 may be connected to each other through a wired interface, or at least some thereof may be wirelessly connected through the communication unit 110. For example, the control unit 120 and the communication unit 110 may be connected via a cable in the wireless device 100 and 200, and the control unit 120 and a first unit (e.g., 130 and 140) may be wirelessly connected through the communication unit 110. In addition, each element, component, unit, and/or module in wireless device 100 and 200 may further include at least one element. For example, the control unit 120 may include at least one processor set. For example, the control unit 120 may be configured as a set of a communication control processor, an application processor, an electronic control unit (ECU), a graphics processing processor, a memory control processor, and the like. In another example, the memory unit 130 may include a random-access memory (RAM), a dynamic RAM (DRAM), a read-only memory (ROM), a flash memory, a volatile memory, a non-volatile memory, and/or a combination thereof.

Next, an illustrative configuration of FIG. 25 is described in detail with reference to the accompanying drawing.

Figure 26:
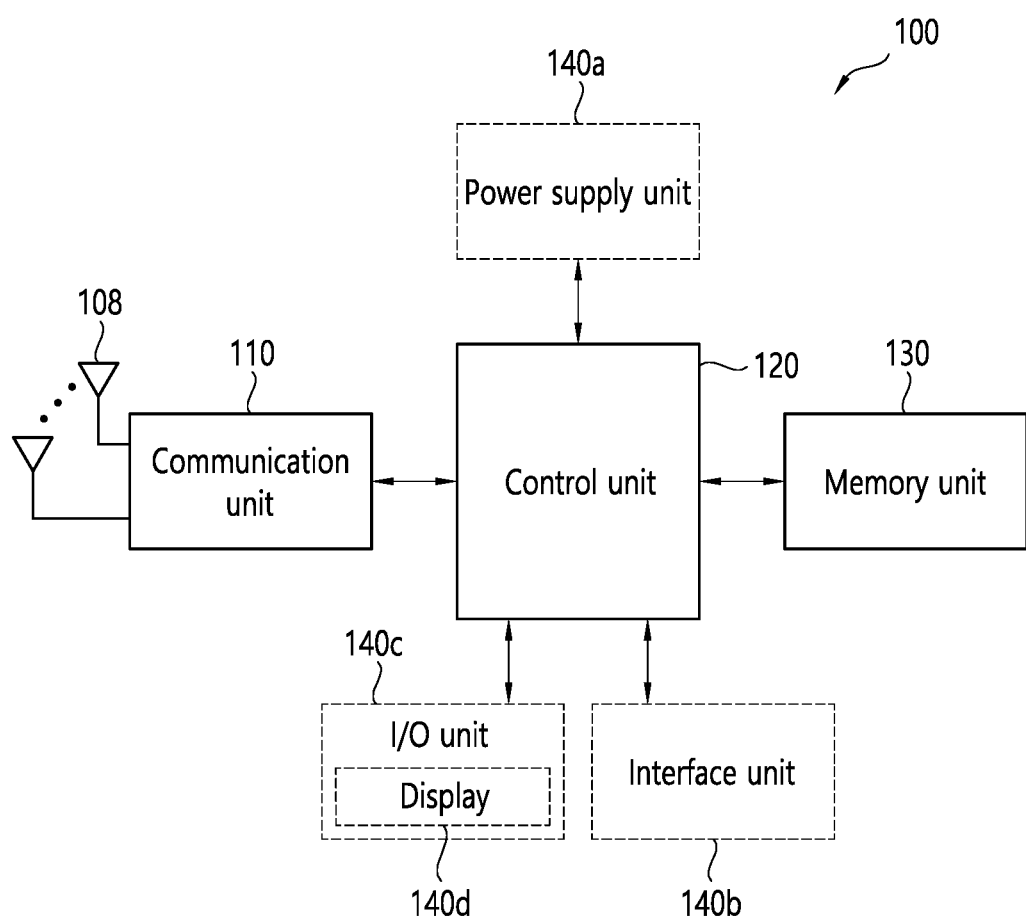
FIG. 26 illustrates a hand-held device applied to the disclosure.

FIG. 26 illustrates a hand-held device applied to the disclosure. The hand-held device may include a smartphone, a smartpad, a wearable device (e.g., a smart watch or smart glasses), and a portable computer (e.g., a notebook). The hand-held device may be referred to as a mobile station (MS), a user terminal (UT), a mobile subscriber station (MSS), a subscriber station (SS), an advanced mobile station (AMS), or a wireless terminal (WT).

Referring to FIG. 26, the hand-held device 100 may include an antenna unit 108, a communication unit 110, a control unit 120, a memory unit 130, a power supply unit 140*a*, an interface unit 140*b*, and an input/output unit 140*c*. The antenna unit 108 may be configured as a part of the communication unit 110. Blocks 110 to 130/140*a* to 140*c* correspond to the blocks 110 to 130/140 in FIG. 25, respectively.

The communication unit 110 may transmit and receive a signal (e.g., data, a control signal, or the like) to and from other wireless devices and base stations. The control unit 120 may control various components of the hand-held device 100 to perform various operations. The control unit 120 may include an application processor (AP). The memory unit 130 may store data/parameter/program/code/command necessary to drive the hand-held device 100. Further, the memory unit 130 may store input/output data/information. The power supply unit 140*a* supplies power to the hand-held device 100 and may include a wired/wireless charging circuit, a battery, and the like. The interface unit 140*b* may support a connection between the hand-held device 100 and a different external device. The interface unit 140*b* may include various ports (e.g., an audio input/output port and a video input/output port) for connection to an external device. The input/output unit 140*c* may receive or output image information/signal, audio information/signal, data, and/or information input from a user. The input/output unit 140*c* may include a camera, a microphone, a user input unit, a display unit 140*d*, a speaker, and/or a haptic module.

For example, in data communication, the input/output unit 140*c* may obtain information/signal (e.g., a touch, text, voice, an image, and a video) input from the user, and the obtained information/signal may be stored in the memory unit 130. The communication unit 110 may convert information/signal stored in the memory unit into a radio signal and may transmit the converted radio signal directly to a different wireless device or to a base station. In addition, the communication unit 110 may receive a radio signal from a different wireless device or the base station and may reconstruct the received radio signal to original information/signal. The reconstructed information/signal may be stored in the memory unit 130 and may then be output in various forms (e.g., text, voice, an image, a video, and a haptic form) through the input/output unit 140*c*.

Figure 27:
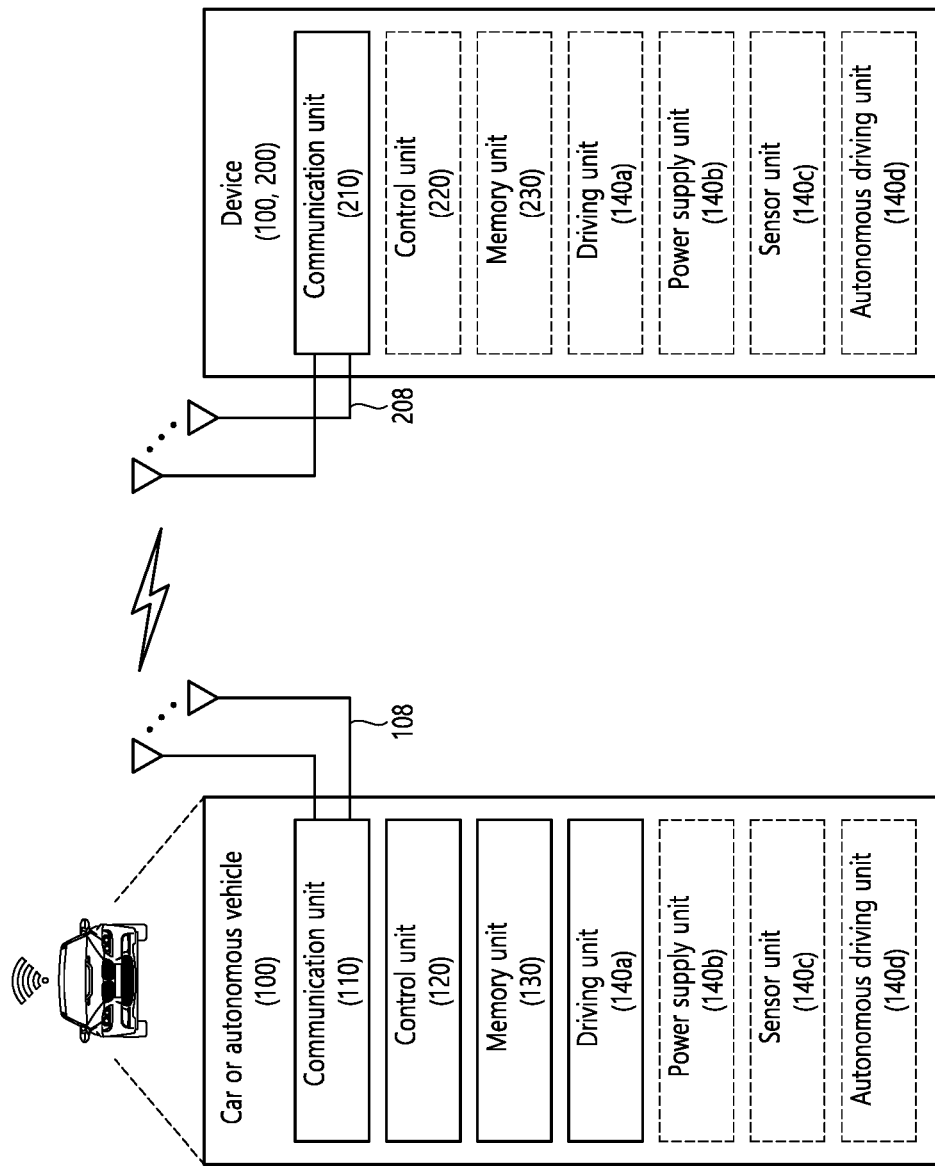
FIG. 27 illustrates a vehicle or an autonomous driving vehicle applied to the disclosure.

FIG. 27 illustrates a vehicle or an autonomous driving vehicle applied to the disclosure. The vehicle or the autonomous driving may be configured as a mobile robot, a car, a train, a manned/unmanned aerial vehicle (AV), a ship, or the like.

Referring to FIG. 27, the vehicle or the autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. Blocks 110/130/140*a* to 140*d* correspond to the blocks 110/130/140 in FIG. 25, respectively.

The communication unit 110 may transmit and receive a signal (e.g., data, a control signal, or the like) to and from external devices, such as a different vehicle, a base station (e.g. a base station, a road-side unit, or the like), and a server. The control unit 120 may control elements of the vehicle or the autonomous driving vehicle 100 to perform various operations. The control unit 120 may include an electronic control unit (ECU). The driving unit 140*a* may enable the vehicle or the autonomous driving vehicle 100 to run on the ground. The driving unit 140*a* may include an engine, a motor, a power train, wheels, a brake, a steering device, and the like. The power supply unit 140*b* supplies power to the vehicle or the autonomous driving vehicle 100 and may include a wired/wireless charging circuit, a battery, and the like. The sensor unit 140*c* may obtain a vehicle condition, environmental information, user information, and the like. The sensor unit 140*c* may include an inertial measurement unit (IMU) sensor, a collision sensor, a wheel sensor, a speed sensor, an inclination sensor, a weight sensor, a heading sensor, a position module, vehicular forward/backward vision sensors, a battery sensor, a fuel sensor, a tire sensor, a steering sensor, a temperature sensor, a humidity sensor, an ultrasonic sensor, an illuminance sensor, a pedal position sensor, and the like. The autonomous driving unit 140*d* may implement a technology for maintaining a driving lane, a technology for automatically adjusting speed, such as adaptive cruise control, a technology for automatic driving along a set route, a technology for automatically setting a route and driving when a destination is set, and the like.

For example, the communication unit 110 may receive map data, traffic condition data, and the like from an external server. The autonomous driving unit 140*d* may generate an autonomous driving route and a driving plan on the basis of obtained data. The control unit 120 may control the driving unit 140*a* to move the vehicle or the autonomous driving vehicle 100 along the autonomous driving route according to the driving plan (e.g., speed/direction control). During autonomous driving, the communication unit 110 may aperiodically/periodically obtain updated traffic condition data from the external server and may obtain surrounding traffic condition data from a neighboring vehicle. Further, during autonomous driving, the sensor unit 140*c* may obtain a vehicle condition and environmental information. The autonomous driving unit 140*d* may update the autonomous driving route and the driving plan on the basis of newly obtained data/information. The communication unit 110 may transmit information about a vehicle location, an autonomous driving route, a driving plan, and the like to the external server. The external server may predict traffic condition data in advance using AI technology or the like on the basis of information collected from vehicles or autonomous driving vehicles and may provide the predicted traffic condition data to the vehicles or the autonomous driving vehicles.

Figure 28:
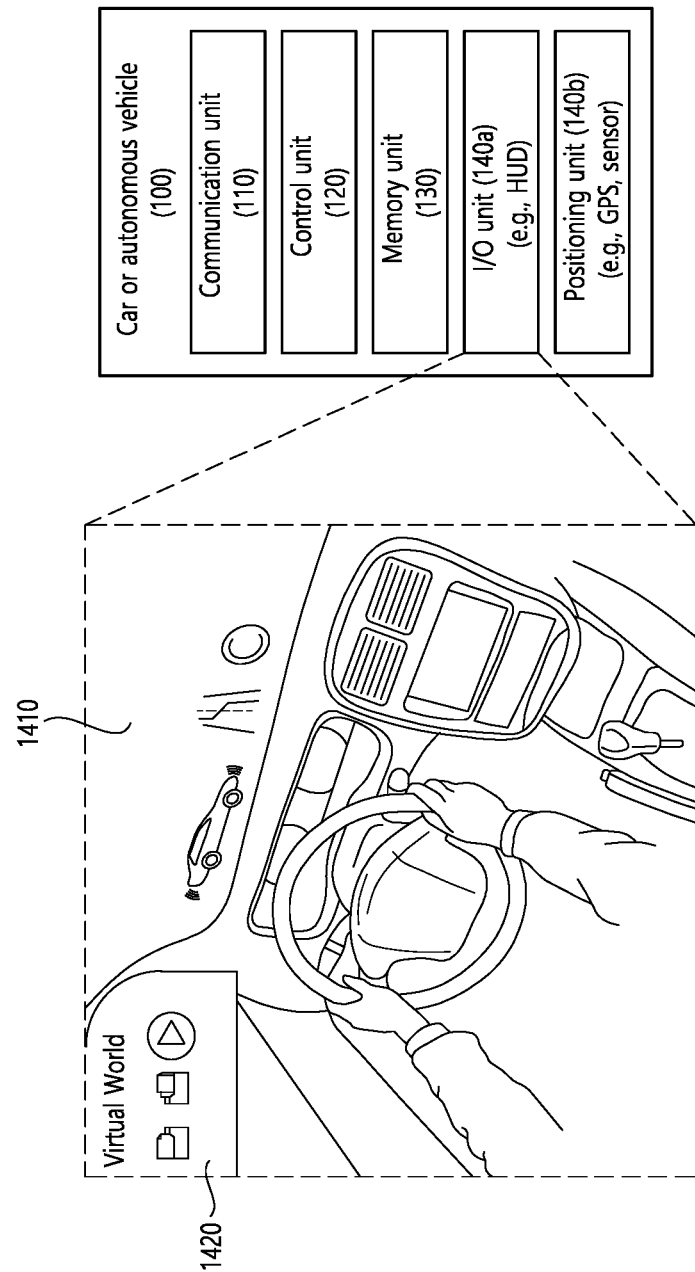
FIG. 28 shows a vehicle applied to the present disclosure.

FIG. 28 shows a vehicle applied to the present disclosure. The vehicle may also be implemented as a transport means, an aerial vehicle, a ship, and so on.

Referring to FIG. 28, a vehicle (100) may include a communication unit (110), a control unit (120), a memory unit (130), an I/O unit (140*a*), and a positioning unit (140*b*). Herein, the blocks 110 to 130/140*a*-140*b* correspond to blocks 110 to 130/140 of FIG. 25, respectively.

The communication unit (110) may transmit and receive signals (e.g., data and control signals) to and from external devices such as other vehicles or BSs. The control unit (120) may perform various operations by controlling constituent elements of the vehicle (100). The memory unit (130) may store data/parameters/programs/code/commands for supporting various functions of the vehicle (100). The I/O unit (140*a*) may output an AR/VR object based on information within the memory unit (130). The I/O unit (140*a*) may include a HUD. The positioning unit (140*b*) may obtain information on the position of the vehicle (100). The position information may include information on an absolute position of the vehicle (100), information on the position of the vehicle (100) within a traveling lane, acceleration information, and information on the position of the vehicle (100) from a neighboring vehicle. The positioning unit (140*b*) may include a GPS and various sensors.

For example, the communication unit (110) of the vehicle (100) may receive map information and traffic information from an external server and store the received information in the memory unit (130). The positioning unit (140*b*) may obtain the vehicle position information through the GPS and various sensors and store the obtained information in the memory unit (130). The control unit (120) may generate a virtual object based on the map information, traffic information, and vehicle position information and the I/O unit (140*a*) may display the generated virtual object in a window in the vehicle (1410, 1420). The control unit (120) may determine whether the vehicle (100) normally drives within a traveling lane, based on the vehicle position information. If the vehicle (100) abnormally exits (or deviates) from the traveling lane, the control unit (120) may display a warning on the window in the vehicle through the I/O unit (140*a*). In addition, the control unit (120) may broadcast a warning message regarding driving abnormality to neighboring vehicles through the communication unit (110). Depending upon the situation, the control unit (120) may transmit the vehicle position information and the information on driving/vehicle abnormality to related organizations.

Figure 29:
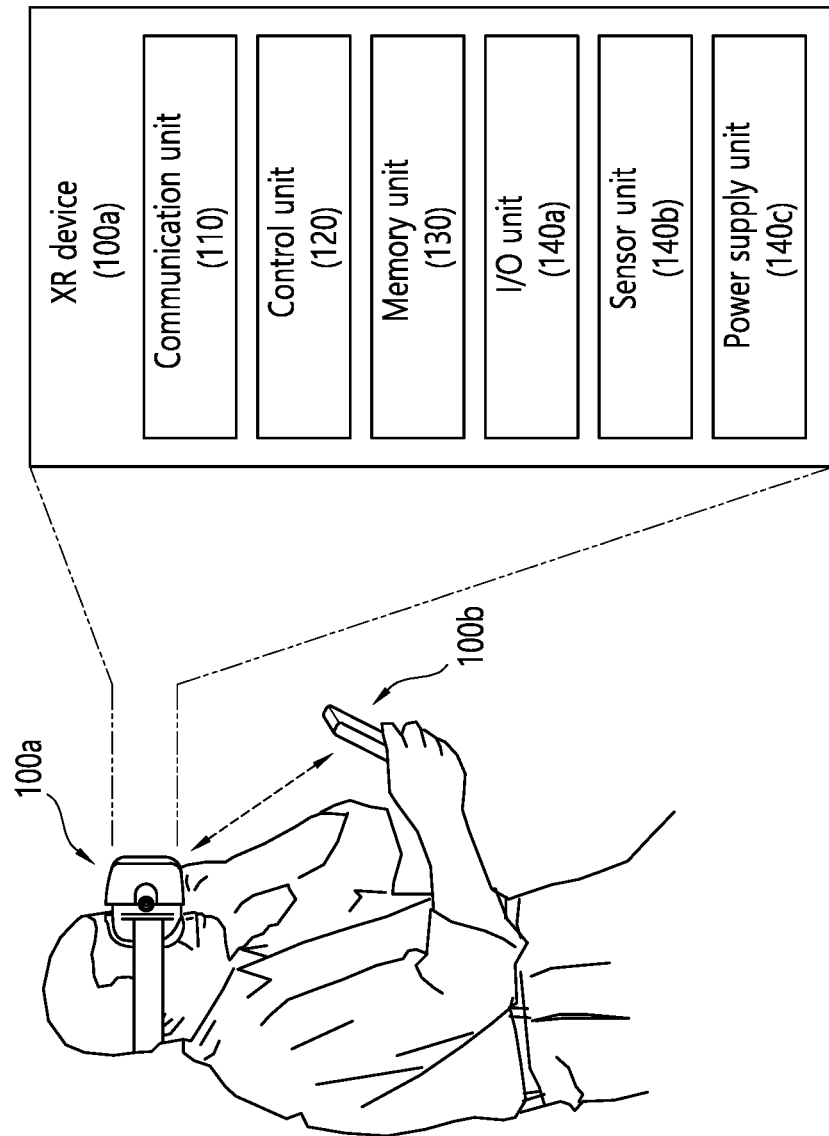
FIG. 29 shows an XR device applied to the present disclosure.

FIG. 29 shows an XR device applied to the present disclosure. The XR device may be implemented as an HMD, a HUD mounted in a vehicle, a television, a smartphone, a computer, a wearable device, a home appliance, a digital signage, a vehicle, a robot, and so on.

Referring to FIG. 29, an XR device (100*a*) may include a communication unit (110), a control unit (120), a memory unit (130), an input/output (I/O) unit (140*a*), a sensor unit (140*b*), and a power supply unit (140*c*). Herein, the blocks 110 to 130/140*a*-140*c* correspond to the blocks 110 to 130/140 of FIG. 25, respectively.

The communication unit (110) may transmit and receive signals (e.g., media data and control signals) to and from external devices such as other wireless devices, hand-held devices, or media servers. The media data may include video, images, and sound. The control unit (120) may perform various operations by controlling constituent elements of the XR device (100*a*). For example, the control unit (120) may be configured to control and/or perform procedures such as video/image acquisition, (video/image) encoding, and metadata generation and processing. The memory unit (130) may store data/parameters/programs/code/commands needed to drive the XR device (100*a*)/to generate XR object. The I/O unit (140*a*) may obtain control information and data from the exterior and output the generated XR object. The I/O unit (140*a*) may include a camera, a microphone, a user input unit, a display unit, a speaker, and/or a haptic module, and so on. The sensor unit (140*b*) may obtain an XR device state, surrounding environment information, user information, and so on. The sensor unit (140*b*) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar, and so on. The power supply unit (140*c*) may supply power to the XR device (100*a*) and include a wired/wireless charging circuit, a battery, and so on.

For example, the memory unit (130) of the XR device (100*a*) may include information (e.g., data, and so on) needed to generate the XR object (e.g., an AR/VR/MR object). The I/O unit (140*a*) may receive a command for manipulating (or operating) the XR device (100*a*) from a user, and the control unit (120) may drive the XR device (100*a*) according to a driving command of a user. For example, when a user wishes to watch a film or news through the XR device (100*a*), the control unit (120) transmits content request information to another device (e.g., a hand-held device (100*b*)) or a media server through the communication unit (130). The communication unit (130) may download/stream content, such as films or news, from another device (e.g., the hand-held device (100*b*)) or the media server to the memory unit (130). The control unit (120) may control and/or perform procedures such as video/image acquisition, (video/image) encoding, and metadata generation/processing with respect to the content and generate/output the XR object based on information on a surrounding space or a real object obtained through the I/O unit (140*a*)/sensor unit (140*b*).

The XR device (100*a*) may be wirelessly connected to the hand-held device (100*b*) through the communication unit (110), and the operation of the XR device (100*a*) may be controlled by the hand-held device (100*b*). For example, the hand-held device (100*b*) may operate as a controller of the XR device (100*a*). To this end, the XR device (100*a*) may obtain information on a 3D position of the hand-held device (100*b*) and generate and output an XR object corresponding to the hand-held device (100*b*).

Figure 30:
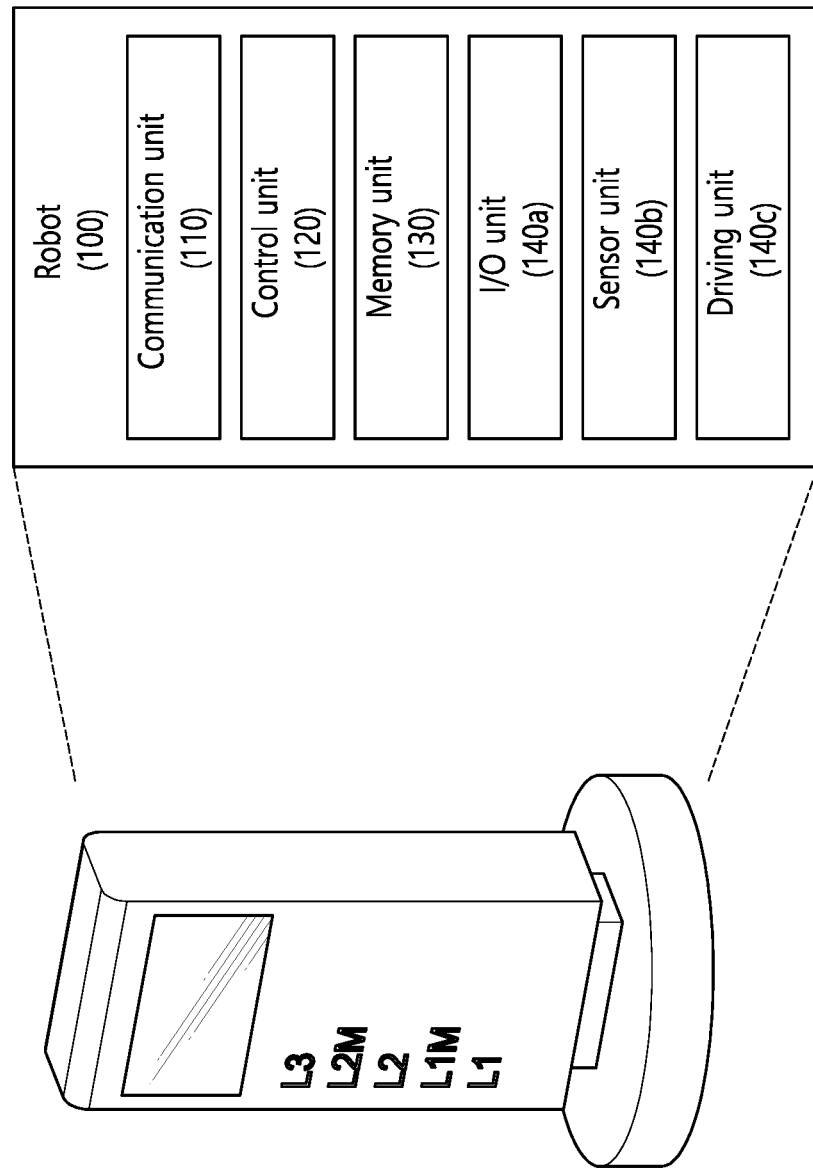
FIG. 30 shows a robot applied to the present disclosure.

FIG. 30 shows a robot applied to the present disclosure. The robot may be categorized into an industrial robot, a medical robot, a household robot, a military robot, and so on, according to a used purpose or field.

Referring to FIG. 30, a robot (100) may include a communication unit (110), a control unit (120), a memory unit (130), an input/output (I/O) unit (140*a*), a sensor unit (140*b*), and a driving unit (140*c*). Herein, the blocks 110 to 130/140*a*-140*c* correspond to the blocks 110 to 130/140 of FIG. 25, respectively.

The communication unit (110) may transmit and receive signals (e.g., driving information and control signals) to and from external devices such as other wireless devices, other robots, or control servers. The control unit (120) may perform various operations by controlling components (or constituent elements) of the robot (100). The memory unit (130) may store data/parameters/programs/code/commands for supporting various functions of the robot (100). The I/O unit (140*a*) may obtain information from the exterior of the robot (100) and output information to the exterior of the robot (100). The I/O unit (140*a*) may include a camera, a microphone, a user input unit, a display unit, a speaker, and/or a haptic module. The sensor unit (140*b*) may obtain internal information of the robot (100), surrounding environment information, user information, and so on. The sensor unit (140*b*) may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, and so on. The driving unit (140c) may perform various physical operations, such as movements of robot joints. In addition, the driving unit (140c) may enable the robot (100) to travel on the road or to fly. The driving unit (140c) may include an actuator, a motor, a wheel, a brake, a propeller, and so on.

Figure 31:
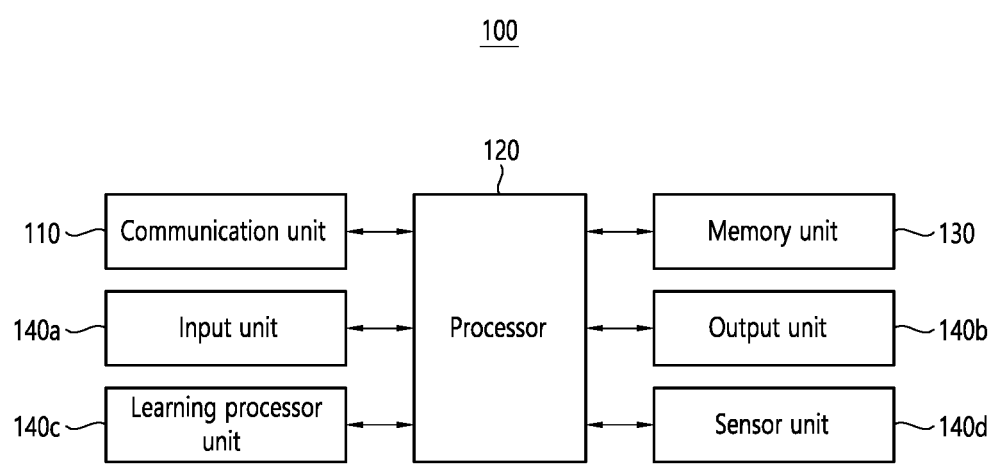
FIG. 31 illustrates an AI device applied to the disclosure.

FIG. 31 illustrates an AI device applied to the disclosure. The AI device may be configured as a stationary device or a mobile device, such as a TV, a projector, a smartphone, a PC, a laptop, a digital broadcasting terminal, a tablet PC, a wearable device, a set-top box, a radio, a washing machine, a refrigerator, digital signage, a robot, and a vehicle.

Referring to FIG. 31, the AI device 100 may include a communication unit 110, a control unit 120, a memory unit 130, an input unit 140a, an output unit 140b, a learning processor unit 140c, and a sensor unit 140d. Blocks 110 to 130/140a to 140d correspond to the blocks 110 to 130/140 of FIG. 28, respectively.

The communication unit 110 may transmit and receive wired or wireless signals (e.g., sensor information, a user input, a learning mode, a control signal, or the like) to and from external devices, a different AI device (e.g., 100x, 200, or 400 in FIG. 22) or an AI server (e.g., 400 in FIG. 22) using wired or wireless communication technologies. To this end, the communication unit 110 may transmit information in the memory unit 130 to an external device or may transmit a signal received from the external device to the memory unit 130.

The control unit 120 may determine at least one executable operation of the AI device 100 on the basis of information determined or generated using a data analysis algorithm or a machine-learning algorithm. The control unit 120 may control components of the AI device 100 to perform the determined operation. For example, the control unit 120 may request, retrieve, receive, or utilize data of the learning processor unit 140c or the memory unit 130 and may control components of the AI device 100 to perform a predicted operation or an operation determined to be preferable among the at least one executable operation. The control unit 120 may collect history information including details about an operation of the AI device 100 or a user's feedback on the operation and may store the history information in the memory unit 130 or the learning processor unit 140c or may transmit the history information to an external device, such as the AI server (400 in FIG. 22). The collected history information may be used to update a learning model.

The memory unit 130 may store data for supporting various functions of the AI device 100. For example, the memory unit 130 may store data obtained from the input unit 140a, data obtained from the communication unit 110, output data from the learning processor unit 140c, and data obtained from the sensing unit 140. Further, the memory unit 130 may store control information and/or a software code necessary for the operation/execution of the control unit 120.

The input unit 140a may obtain various types of data from the outside of the AI device 100. For example, the input unit 140a may obtain learning data for model learning and input data to which a learning model is applied. The input unit 140a may include a camera, a microphone, and/or a user input unit. The output unit 140b may generate visual, auditory, or tactile output. The output unit 140b may include a display unit, a speaker, and/or a haptic module. The sensing unit 140 may obtain at least one of internal information about the AI device 100, environmental information about the AI device 100, and user information using various sensors. The sensing unit 140 may include a proximity sensor, an illuminance sensor, an acceleration sensor, a magnetic sensor, a gyro sensor, an inertial sensor, an RGB sensor, an IR sensor, a fingerprint sensor, an ultrasonic sensor, an optical sensor, a microphone, and/or a radar.

The learning processor unit 140c may train a model including artificial neural networks using learning data. The learning processor unit 140c may perform AI processing together with a learning processor unit of an AI server (400 in FIG. 22). The learning processor unit 140c may process information received from an external device through the communication unit 110 and/or information stored in the memory unit 130. In addition, an output value from the learning processor unit 140c may be transmitted to an external device through the communication unit 110 and/or may be stored in the memory unit 130.

What is claimed is:

1. A method for transmitting data in a wireless communication system, the method performed by a user equipment (UE) and comprising:
    selecting a pool of resources among pools of resources, and
    transmitting the data based on the selected pool of resources,
    wherein the pools of resources comprise i) at least one pool of resources not configured with physical sidelink feedback channel (PSFCH) resources and ii) at least one pool of resources configured with PSFCH resources,
    wherein the UE selects any pool of resources among the pools of resources for data for which hybrid automatic repeat request (HARQ) feedback is disabled, and
    wherein the UE selects any pool of resources configured with PSFCH resources among the pools of resources for data for which HARQ feedback is enabled.

2. The method of claim 1, wherein a shorter time duration of physical sidelink shared channel (PSSCH) is configured to the at least one pool of resources configured with PSFCH resources compared to the at least one pool of resources not configured with PSFCH resources.

3. The method of claim 1, wherein the pool of resources is selected per a packet for the data.

4. The method of claim 1, wherein the data is transmitted through a physical sidelink shared channel (PSSCH).

5. A user equipment (UE) comprising:
    a transceiver transmitting and receiving radio signals; and
    a processor being operatively connected to the transceiver,
    wherein the processor is adapted to:
    select a pool of resources among pools of resources, and
    transmit data based on the selected pool of resources,
    wherein the pools of resources comprise i) at least one pool of resources not configured with physical sidelink feedback channel (PSFCH) resources and ii) at least one pool of resources configured with PSFCH resources,
    wherein the processor selects any pool of resources among the pools of resources for data for which hybrid automatic repeat request (HARQ) feedback is disabled, and
    wherein the processor selects any pool of resources configured with PSFCH resources among the pools of resources for data for which HARQ feedback is enabled.

6. The UE of claim 5, wherein a shorter time duration of physical sidelink shared channel (PSSCH) is configured to the at least one pool of resources configured with PSFCH resources compared to the at least one pool of resources not configured with PSFCH resources.

7. The UE of claim 5, wherein the pool of resources is selected per a packet for the data.

8. The UE of claim 5, wherein the data is transmitted through a physical sidelink shared channel (PSSCH).

9. A processor for a wireless communication device in a wireless communication system, wherein the processor is adapted to control the wireless communication device to:

select a pool of resources among pools of resources, and transmit data based on the selected pool of resources, wherein the pools of resources comprise i) at least one pool of resources not configured with physical sidelink feedback channel (PSFCH) resources and ii) at least one pool of resources configured with PSFCH resources, wherein the processor selects any pool of resources among the pools of resources for data for which hybrid automatic repeat request (HARQ) feedback is disabled, and wherein the processor selects any pool of resources configured with PSFCH resources among the pools of resources for data for which HARQ feedback is enabled.

10. The processor of claim 9, wherein a shorter time duration of physical sidelink shared channel (PSSCH) is configured to the at least one pool of resources configured with PSFCH resources compared to the at least one pool of resources not configured with PSFCH resources.

11. The processor of claim 9, wherein the pool of resources is selected per a packet for the data.

12. The processor of claim 9, wherein the data is transmitted through a physical sidelink shared channel (PSSCH).

* * * * *